US012647445B2

(12) United States Patent
Tomic et al.

(10) Patent No.: US 12,647,445 B2
(45) **Date of Patent: \*Jun. 2, 2026**

(54) SYSTEM AND METHOD FOR EMULATING A KNOWN ATTACK ON A TARGET COMPUTER NETWORK

(71) Applicant: AttackIQ, Inc., San Diego, CA (US)

(72) Inventors: George Tomic, San Diego, CA (US);
Andres Gazzoli, San Diego, CA (US);
Pablo Caballero, San Diego, CA (US);
Raul Lopez, San Diego, CA (US);
Franco Ardiani, San Diego, CA (US);
Juan Pablo Fuertes, San Diego, CA
(US); Facundo Osimi, San Diego, CA
(US); Rajesh K Sharma, San Diego,
CA (US)

(73) Assignee: AttackIQ, Inc., San Diego, CA (US)

( * ) Notice: Subject to any disclaimer, the term of this
patent is extended or adjusted under 35
U.S.C. 154(b) by 171 days.

This patent is subject to a terminal dis-
claimer.

(21) Appl. No.: 18/434,372

(22) Filed: Feb. 6, 2024

(65) Prior Publication Data

US 2024/0179175 A1 May 30, 2024

Related U.S. Application Data

(63) Continuation-in-part of application No. 18/529,968,
filed on Dec. 5, 2023, now Pat. No. 12,177,244,
(Continued)

(51) Int. Cl.
*H04L 9/40* (2022.01)

(52) U.S. Cl.
CPC ...... *H04L 63/1433* (2013.01); *H04L 63/1416*
(2013.01); *H04L 63/1425* (2013.01); *H04L*
*63/1466* (2013.01)

(58) Field of Classification Search
CPC ............. H04L 63/1433; H04L 63/1416; H04L
63/1425; H04L 63/1466
(Continued)

(56) References Cited

U.S. PATENT DOCUMENTS 6,907,396 B1 * 6/2005 Muttik .................... G06F 21/56
703/22
9,292,695 B1 * 3/2016 Bassett ................. G06F 21/577
(Continued)

*Primary Examiner* — Noura Zoubair
*Assistant Examiner* — Mahabub S Ahmed
(74) *Attorney, Agent, or Firm* — Run8 Patent Group,
LLC; Peter Miller; Brian T. Chew

(57) ABSTRACT

One variation of a system for emulating a known attack on
a computer network includes a computer system configured
to: generate a set of data packets by recombining packet
fragments transmitted between machines during a prior
malicious attack on a second network; define transmission
triggers for transmission of the set of data packets between
pairs of agents connected to a target network based on
timestamps of packet fragments; generate an executable file
including the set of data packets and the transmission
triggers; initiate transmission of the set of data packets
between the pairs assets according to the set of transmission
triggers to emulate the malicious attack on the target net-
work; and, in response to absence of a security event related
to the emulation in a log of a security technology deployed
on the target network, generate a prompt to reconfigure the
security technology to respond to the malicious attack.

20 Claims, 8 Drawing Sheets

Related U.S. Application Data which is a continuation of application No. 18/087,360, filed on Dec. 22, 2022, now Pat. No. 11,876,829, which is a continuation of application No. 17/083,275, filed on Oct. 28, 2020, now Pat. No. 11,563,765.

(60) Provisional application No. 63/008,451, filed on Apr. 10, 2020.

(58) Field of Classification Search
USPC ........................................................ 726/22–25
See application file for complete search history.

(56) References Cited

U.S. PATENT DOCUMENTS

| | | | | |
|---|---|---|---|---|
| 9,686,296 | B1 * | 6/2017 | Murchison | H04L 63/08 |
| 9,894,090 | B2 * | 2/2018 | Hebert | H04L 63/1408 |
| 10,091,238 | B2 * | 10/2018 | Shieh | H04L 63/0263 |
| 10,270,789 | B2 * | 4/2019 | Singh | H04L 63/1416 |
| 10,462,186 | B2 * | 10/2019 | Daugherty | H04L 63/1433 |
| 10,764,313 | B1 * | 9/2020 | Mushtaq | G06N 20/00 |
| 10,931,713 | B1 * | 2/2021 | Allam | H04L 63/1483 |
| 11,057,428 | B1 * | 7/2021 | Sellers | G06F 16/27 |
| 11,158,207 | B1 * | 10/2021 | Sadeh-Koniecpol | G06F 21/566 |
| 11,223,635 | B2 * | 1/2022 | Cabe | G06F 21/53 |
| 11,750,634 | B1 * | 9/2023 | Chowdhary | H04L 63/1416 726/25 |
| 2003/0208616 | A1 * | 11/2003 | Laing | H04L 69/22 709/236 |
| 2005/0166072 | A1 * | 7/2005 | Converse | H04L 63/1441 726/5 |
| 2006/0123480 | A1 * | 6/2006 | Oh | H04L 63/1408 726/23 |
| 2006/0191010 | A1 * | 8/2006 | Benjamin | G06F 21/552 726/23 |
| 2008/0109905 | A1 * | 5/2008 | Grosse | H04L 63/1458 726/23 |
| 2008/0271146 | A1 * | 10/2008 | Rooney | H04L 63/1425 726/23 |
| 2008/0289039 | A1 * | 11/2008 | Rits | H04L 63/123 726/22 |
| 2009/0044270 | A1 * | 2/2009 | Shelly | H04L 63/02 726/22 |
| 2010/0325412 | A1 * | 12/2010 | Norrman | G06Q 10/06 726/25 |
| 2011/0185432 | A1 * | 7/2011 | Sandoval | H04L 63/1433 726/25 |
| 2012/0144476 | A1 * | 6/2012 | McClure | G02B 6/12011 370/254 |
| 2014/0325634 | A1 * | 10/2014 | Iekel-Johnson | H04L 63/101 726/13 |
| 2015/0295948 | A1 * | 10/2015 | Hassell | H04L 63/1441 726/25 |
| 2016/0134653 | A1 * | 5/2016 | Vallone | H04L 63/1433 726/25 |
| 2016/0285907 | A1 * | 9/2016 | Nguyen | H04L 63/1433 |
| 2017/0006055 | A1 * | 1/2017 | Strom | G06F 30/20 |
| 2017/0093910 | A1 * | 3/2017 | Gukal | H04L 63/1416 |
| 2017/0118241 | A1 * | 4/2017 | Call | H04L 67/04 |
| 2017/0134400 | A1 * | 5/2017 | Nguyen | H04L 63/1416 |
| 2017/0339187 | A1 * | 11/2017 | Papamartzivanos | G06N 3/126 |
| 2018/0139224 | A1 * | 5/2018 | Arnell | H04L 63/1408 |
| 2018/0191754 | A1 * | 7/2018 | Higbee | H04L 63/1416 |
| 2018/0307833 | A1 * | 10/2018 | Noeth | G06F 21/554 |
| 2019/0149572 | A1 * | 5/2019 | Gorodissky | G06F 21/55 726/25 |
| 2019/0258782 | A1 * | 8/2019 | Lerner | G07C 9/257 |
| 2019/0281082 | A1 * | 9/2019 | Carmichael | G06F 21/577 |
| 2020/0050760 | A1 * | 2/2020 | El-Moussa | G06N 3/0499 |
| 2020/0053104 | A1 * | 2/2020 | El-Moussa | G06N 3/0455 |
| 2020/0099700 | A1 * | 3/2020 | Ettema | G06F 21/53 |
| 2020/0280576 | A1 * | 9/2020 | Key | H04L 63/20 |
| 2020/0313847 | A1 * | 10/2020 | Plusquellic | H04L 9/16 |
| 2021/0035116 | A1 * | 2/2021 | Berrington | G06N 5/04 |
| 2021/0089647 | A1 * | 3/2021 | Suwad | G06F 21/552 |
| 2022/0263860 | A1 * | 8/2022 | Crabtree | H04L 63/1425 |
| 2022/0278993 | A1 * | 9/2022 | Korakin | H04L 63/20 |
| 2023/0308473 | A1 * | 9/2023 | Limb | G06N 3/08 |
| 2023/0336581 | A1 * | 10/2023 | Dunn | G06F 21/577 |
| 2023/0370439 | A1 * | 11/2023 | Crabtree | H04L 63/0428 |

* cited by examiner

S100

| No. | Time | Source | Destination | Protocol | Length | Info |
|---|---|---|---|---|---|---|
| 1 | 0.000000 | 192.168.0.164 | 172.217.17.4 | TCP | 78 | 52070→80[SYN] Seq=0 Win=65535... |
| 2 | 0.018894 | 172.217.17.4 | 192.168.0.164 | TCP | 74 | 80→52070[SYN,ACK] Seq=0 Ack=... |
| 3 | 0.018894 | 192.168.0.164 | 172.217.17.4 | TCP | 66 | 52070→80[ACK] Seq=1 Ack=1Win... |
| → 4 | 0.019076 | 192.168.0.164 | 172.217.17.4 | HTTP | 139 | GET / HTTP/1.1 |
| 5 | 0.036593 | 172.217.17.4 | 192.168.0.164 | TCP | 66 | 80→52070[ACK] Seq=1 Ack=74 Wi... |
| ● 6 | 0.093001 | 172.217.17.4 | 192.168.0.164 | TCP | 1484 | 80→52070[ACK] Seq=1 Ack=74 Wi... |
| ● 7 | 0.093005 | 172.217.17.4 | 192.168.0.164 | TCP | 1484 | 80→52070[ACK] Seq=1419 Ack=74... |
| 8 | 0.093079 | 192.168.0.164 | 172.217.17.4 | TCP | 66 | 52070→80[ACK] Seq=74 Ack=2837... |
| ● 9 | 0.093481 | 172.217.17.4 | 192.168.0.164 | TCP | 1484 | 80→52070[ACK] Seq=2837 Ack=74... |
| ● 10 | 0.093488 | 172.217.17.4 | 192.168.0.164 | TCP | 1484 | 80→52070[ACK] Seq=4255 Ack=74... |
| ● 11 | 0.093489 | 172.217.17.4 | 192.168.0.164 | TCP | 1484 | 80→52070[ACK] Seq=5673 Ack=74... |
| 12 | 0.093570 | 192.168.0.164 | 172.217.17.4 | TCP | 66 | 52070→80[ACK] Seq=74 Win=5673... |
| 13 | 0.093612 | 192.168.0.164 | 172.217.17.4 | TCP | 66 | 52070→80[ACK] Seq=74 Win=7091... |
| ● 14 | 0.093763 | 172.217.17.4 | 192.168.0.164 | TCP | 1484 | 80→52070[ACK] Seq=7091 Ack=74... |
| ● 15 | 0.093769 | 172.217.17.4 | 192.168.0.164 | TCP | 1484 | 80→52070[ACK] Seq=8509 Ack=74... |
| ● 16 | 0.093771 | 172.217.17.4 | 192.168.0.164 | TCP | 1484 | 80→52070[ACK] Seq=9927 Ack=74... |
| 17 | 0.093834 | 192.168.0.164 | 172.217.17.4 | TCP | 66 | 52070→80[ACK] Seq=74 Ack=9927... |
| 18 | 0.093960 | 192.168.0.164 | 172.217.17.4 | TCP | 66 | 52070→80[ACK] Seq=74 Ack=1134... |
| ● 19 | 0.094021 | 172.217.17.4 | 192.168.0.164 | TCP | 1484 | 80→52070[ACK] Seq=11345 Ack=7... |
| ● 20 | 0.094025 | 172.217.17.4 | 192.168.0.164 | TCP | 1111 | 80→52070[PSH,ACK] Seq=12763... |
| 21 | 0.094089 | 192.168.0.164 | 172.217.17.4 | TCP | 66 | 52070→80[ACK] Seq=74 Ack=1380... |
| ← 22 | 0.115397 | 172.217.17.4 | 192.168.0.164 | HTTP | 71 | HTTP/1.1 200 OK (text/html) |
| 23 | 0.115477 | 192.168.0.164 | 172.217.17.4 | TCP | 66 | 52070→80[ACK] Seq=74 Ack=1381... |
| 24 | 0.115653 | 192.168.0.164 | 172.217.17.4 | TCP | 66 | 52070→80[FIN,ACK] Seq=74 Ack... |
| 25 | 0.136699 | 172.217.17.4 | 192.168.0.164 | TCP | 66 | 80→52070[FIN,ACK] Seq=13813... |
| 26 | 0.136778 | 192.168.0.164 | 172.217.17.4 | TCP | 66 | 52070→80[ACK] Seq=75 Ack=1381... |

▸ Frame 22: 71 bytes on wire (568 bits), 71 bytes captured (568 bits)
▸ Ethernet II, Src: Sagemcom_3e:30:d4 (28:9e:fc:3e:30:d4), Dst: Apple_c4:ef:3e (38:f9:d3:c4:ed:3e)

▸ Internet Protocol Version 4, Src: 172.217.17.4, Dst: 192.168.0.164
▸ Transmission Control Protocol, Src Port: 80, Dst Port: 52070, Seq: 13808, Ack: 74, Len:5
▸ [11 Reassembled TCP Segments (13812 bytes) :#6(1418),#7(1418),#9(1418),#10(1418),
　#11(1418),#14(1418)
▸ Hypertext Transfer Protocol
▸ Line=based text data: text/html (11 lines)

```
0000  38 f9 d3 c4 ef 3e 28 9e fc 3e 30 d4 08 00 45 80   8··>(· ·>0···E·
0010  00 39 7e 00 00 00 7a 06 43 05 ac d9 11 04 c0 a8   ·9····z·· C·······
0020  00 a4 00 cb 66 66 11 53 83 39 f4 d0 93 c6 80 18   ···P·f·S· ·9······
0030  00 ec f9 20 00 00 01 01 08 0a 49 47 61 e1 47 d3   ··· ···· ··IGa·G·
0040  dd 88 30 0d 0a 0d 0a                              ··· 0 ···
```

| Frame (71 bytes) | Reassembled TCP (13812 bytes) | De-chunked entity body (13067 bytes) |
|---|---|---|

○ 🗹 curl_google.pcap　　　　Packets:26 · Displayed: 26 (100%)　　Profile: Default

JSON　Raw Data　Headers
Save Copy Collapse All Expand All ⟨ Filter JSON
▼ 0:
▼ conversation:
　client:　"192.168.0.164"
　port:　80
　protocol:　"tcp"
　server:　"172.217.17.4"
　▼ streams_client
　　▼ 0:
　　　0: 1
　　▸ 1: "zVZVpk6MoXFRPqnbr4cRiTrp
　　　...RUwQI05Du1gddvgIXsZxDy="

▼ streams_server:
　　▼ 0:
　　　0: 2
　　▸ 1: "NcSXLGcFRYor6vnmUQpqEK
　　　EE...ExeBpe64HYE58Lunb4X9Sff"
timestamp:　1591895959074157

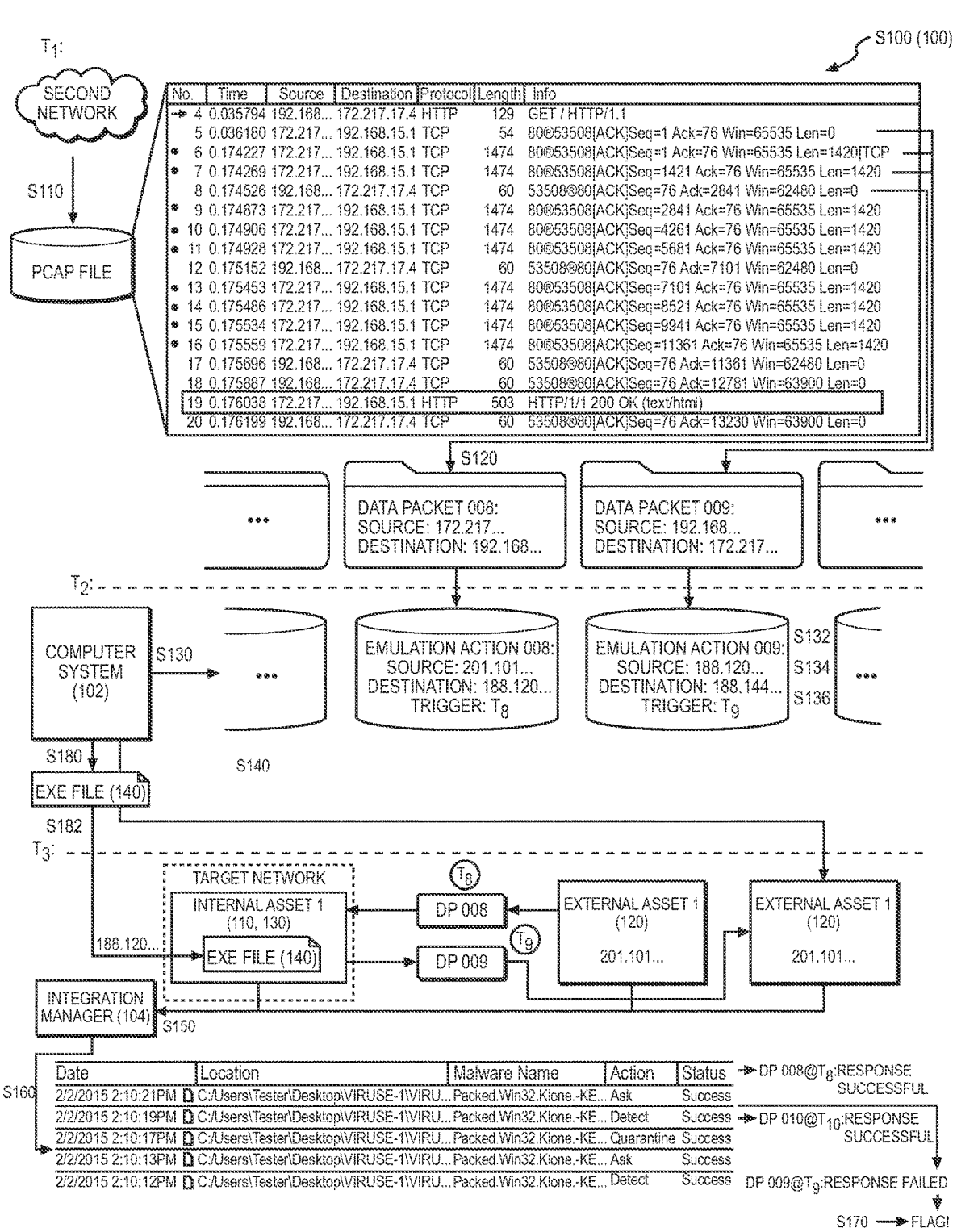
_FIGURE 5_

SYSTEM AND METHOD FOR EMULATING A KNOWN ATTACK ON A TARGET COMPUTER NETWORK

CROSS-REFERENCE TO RELATED APPLICATIONS

This Application is a continuation-in-part of U.S. patent application Ser. No. 18/529,968, filed on 5 Dec. 2023, which is a continuation of U.S. patent application Ser. No. 18/087,360, filed on 22 Dec. 2022, which is a continuation of U.S. patent application Ser. No. 17/083,275, filed on 28 Oct. 2020, which claims the benefit of U.S. Provisional Patent Application No. 63/008,451, filed on 10 Apr. 2020, each of which is incorporated in its entirety by this reference.

TECHNICAL FIELD

This invention relates generally to the field of computer network security and more specifically to a new and useful system and method for emulating a known attack on a target computer network in the field of computer network security.

BRIEF DESCRIPTION OF THE FIGURES

FIG. 4 is a graphical representation of one variation of the method;

FIG. 5 is a flowchart representation of one variation of the method;

DESCRIPTION OF THE EMBODIMENTS

Figure 1:
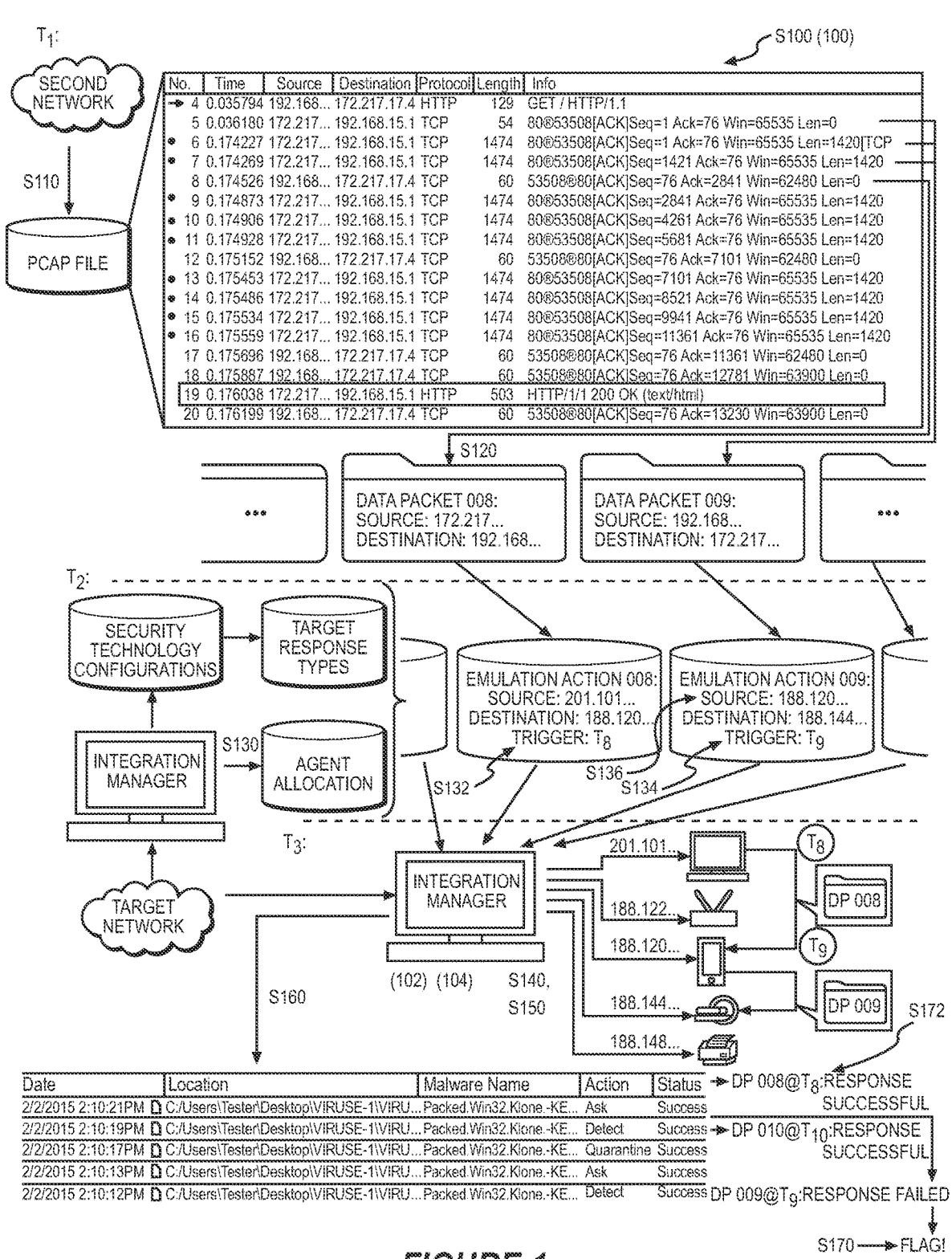
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIG. 5, a method S100 for emulating a known attack on a computer network includes: accessing a set of data packets representing data transmitted between machines in communication with a second computer network during a malicious attack on the second computer network during a first time period in Blocks S110 and S120; and assigning a set of assets as actors in an emulation of the malicious attack on a target computer network, the set of assets including a first internal asset 110 within the target computer network in Block S130.

The method S100 also includes, for each data packet in the set of data packets: assigning a transmission trigger, in a set of transmission triggers, to the data packet based on transmission of corresponding data during the malicious attack on the second computer network in Block S132; assigning a recipient asset, in the set of assets, to receive the data packet in Block S134; and assigning a source asset, in the set of assets, to transmit the data packet to the recipient asset according to the transmission trigger in Block S136.

The method S100 further includes, in Block S180, generating an executable file 140: including the set of data packets; and defining the set of transmission triggers.

The method S100 also includes: during a second time period succeeding the first time period and in response to execution of the executable file 140 at the first internal asset 110, initiating transmission of the set of data packets from source assets to recipient assets, in the set of assets, according to the set of transmission triggers to emulate the malicious attack on the target network in Block S150; accessing a set of network event records generated by a security technology, deployed on the target computer network, during the second time period in Block S160; and, in response to absence of a network event record, in the set of network event records—indicating the malicious attack—generating a prompt to reconfigure the security technology to detect the malicious attack at the target computer network in Block S170.

1.1 Variation: Security Technology Validation

As shown in FIG. 5, one variation of the method S100 includes: accessing a set of data packets representing data transmitted between machines in communication with a second computer network during a malicious attack on the second computer network during a first time period in Blocks S110 and S120; and selecting a set of assets as actors in an emulation of the malicious attack on a target computer network, the set of assets including a first internal asset 110 within the target computer network in Block S130.

The method S100 also includes, for each data packet in the set of data packets: assigning a transmission trigger, in a set of transmission triggers, to the data packet based on transmission of corresponding data during the malicious attack on the second computer network in Block S132; selecting a recipient asset, in the set of assets, to receive the data packet in Block S134; and selecting a source asset, in the set of assets, to transmit the data packet to the recipient asset according to the transmission trigger in Block S136.

The method S100 also includes: populating an executable file 140 with the set of data packets and the set of transmission triggers in Block S180; during a second time period succeeding the first time period and in response to execution of the executable file 140 at the first internal asset 110, initiating transmission of the set of data packets from source assets to recipient assets, in the set of assets, according to the set of transmission triggers to emulate the malicious attack on the target network in Block S150; accessing a set of network event records generated by a security technology, deployed on the target computer network, during the second time period in Block S160; and, in response to presence of a second network event record—in the set of network event records—indicating the malicious attack, confirming configuration of the security technology to respond to the malicious attack in Block S170.

1.2 Variation: Self-Contained Attack Emulation Package

As shown in FIG. 5, one variation of the method S100 includes: accessing a packet capture file representing packet fragments transmitted between machines in communication with a second network during a malicious attack on the second network in Block S110; and recombining packet fragments within the packet capture file based on packet fragment metadata to generate a set of data packets in Block S120.

This variation of the method S100 also includes, for each data packet in the set of data packets: assigning a transmission trigger, in a set of transmission triggers, to the data packet based on transmission of corresponding data during the malicious attack on the second computer network in Block S132; selecting a recipient asset, in a set of assets assigned as actors in an emulation of the malicious attack on the target computer network, to receive the data packet in Block S134; and selecting a source asset, in the set of assets, to transmit the data packet to the recipient asset according to the transmission trigger in Block S136.

This variation of the method S100 further includes, in Block S180, for a first internal asset 110—in the set of assets and within the target computer network—generating an executable file 140: populated with the set of data packets and the set of transmission triggers; and configured to selectively initiate transmission of data packets, in the set of data packets, from the first internal asset 110 to recipient assets, in the set of assets, according to the transmission triggers, in the set of transmission triggers, responsive to execution of the executable file 140 at the first internal asset 110.

This variation of the method S100 also includes storing the executable file 140 for loading onto the first internal asset 110 in Block S182.

1.3 System

As shown in FIG. 5, a system 100 for emulating a known attack on a computer network includes: a second external asset 120; and a computer system 102. The computer system 102 is configured to: access a set of data packets representing data transmitted between machines in communication with a second computer network during a malicious attack on the second computer network; and select a set of assets as actors in an emulation of the malicious attack on a target computer network, the set of assets including a first internal asset 110 within the target computer network and the second external asset 120 external to the target computer network.

The computer system 102 is also configured to, for each data packet in the set of data packets: assign a transmission trigger, in a set of transmission triggers, to the data packet based on transmission of corresponding data during the malicious attack on the second computer network; select a recipient asset, in the set of assets, to receive the data packet; and select a source asset, in the set of assets, to transmit the data packet to the recipient asset according to the transmission trigger.

The computer system 102 is further configured to generate an executable file 140: including the set of data packets; defining the set of transmission triggers; and configured to selectively initiate transmission of data packets in the set of data packets, from the first internal asset 110 to recipient assets in the set of assets, according to transmission triggers in the first subset of transmission triggers, responsive to execution of the executable file 140 at the first internal asset 110.

The computer system 102 is also configured to: store the executable file 140 for loading onto the first internal asset 110; and trigger the second external asset 120 to store the set of data packets in local memory.

1.4 Variation: Behavior Triggers

As shown in FIG. 5, one variation of the system 100 includes a computer system 102 configured to: access a set of data packets representing behaviors of machines in communication with a second computer network during a malicious attack on the second computer network; select a set of assets as actors in an emulation of the malicious attack on a target computer network, the set of assets including a first internal asset 110 within the target computer network and a second external asset 120 external to the target computer network.

The computer system 102 is also configured to, for each data packet in the set of data packets: assign a behavior trigger, in a set of behavior triggers, to the data packet based on a corresponding behavior during the malicious attack on the second computer network; select a recipient asset, in the set of assets, to receive the data packet; and select a source asset, in the set of assets, to transmit the data packet to the recipient asset according to the transmission trigger.

The computer system 102 is further configured to generate an executable file 140: populated with the set of data packets and the set of behavior triggers; and configured to selectively initiate transmission of the data packets in the set of data packets, from the first internal asset 110 to recipient assets in the set of assets, according to behavior triggers in the set of behavior triggers, responsive to execution of the executable file 140 at the first internal asset 110.

The computer system 102 is also configured to store the executable file 140 for loading onto the first internal asset 110.

1.5 Computer-Readable Medium

As shown in FIG. 5, a non-transitory computer-readable medium 130 stores an executable file 140 including instructions that, when executed by a processor of a first internal asset 110 in a set of assets and within a target computer network, cause the processor to access a set of data packets from the executable file 140, the set of data packets representing data transmitted between machines in communication with a second computer network during a malicious attack on the second computer network, each data packet in the set of data packets: associated with a transmission trigger, in a set of transmission triggers, based on transmission of corresponding data during the malicious attack on the second computer network; defining a recipient asset, in the set of assets, to receive the data packet; and defining the source asset, in the set of assets, to transmit the data packet to the recipient asset according to the transmission trigger.

The non-transitory computer-readable medium stores the executable file 140 further including instructions that, when executed by the processor, cause the processor to: store the set of data packets in local memory of the first internal asset 110, the set of data packets including a first data packet to which the first internal asset 110 and a second external asset 120, in the set of assets, are assigned; initiate transmission of the first data packet from the first internal asset 110 to the second external asset 120 according to a first transmission trigger, in the set of transmission triggers, during a target time period; and generate a set of network event records during transmission of the set of data packets from source assets to recipient assets, in the set of assets, according to the set of transmission triggers during the target time period.

2. Applications

Generally, a computer system 102 can execute Blocks of the method S100: to access a PCAP file containing packet fragments transmitted between machines within the second network and representative of bandwidth and other characteristics of the second network during a previous attack on the second network; and to recombine data fragments in this PCAP file to form a set of data packets representative of original "conversations" between these machines during the previous attack. The computer system 102 can then: designate source and destination agents—installed on assets (e.g., servers, switches, printers, computers, smartphones) within and outside of the target network but not configured to execute commands or extract other data contained within these data packets—to send and receive these data packets during an attack emulation on the target network based on source and destination addresses of machines associated with corresponding data fragments in the PCAP file; generate a emulation schedule for transmission of these data packets between these source and destination agents based on timestamps of corresponding data fragments represented in the PCAP file; initiate an attack emulation in which designated source agents transmit assigned data packets to designated destination agents according to the emulation schedule; and monitor security technologies installed on the target network for detection, prevention, and/or alert events in response to this emulation. The computer system 102 can then verify whether these security technologies deployed on the target network are properly configured to respond to an authentic analogous attack on the target network based on whether these security technologies generated detection, prevention, or alert events related to these data packets during this emulation.

In particular, merely triggering assets on the target network to transmit and receive data fragments recorded in the PCAP file during the previous attack on the second network: may fail to represent traffic, bandwidth, and configuration differences between the target network and the second network; and may thus fail to accurately depict exploitation of the target network according to the attack such that success or failure of security technologies—deployed on the target network—to detect, prevent, or alert on these data fragments may not be predictive of whether these security technologies are properly configured to detect, prevent, or alert on this attack occurring on the target network.

Therefore, the computer system 102 can: reconstruct an authentic attack "conversation" from this previous attack on the second network by reassembling data fragments—stored in the PCAP file—into complete data packets; and then replay this attack "conversation" by coordinating transmission of these data packets between two agents (or "actors") within and/or outside of the target network during an attack emulation. The computer system 102 can also construct multiple concurrent and/or serial "conversations" between multiple pairs of internal and/or external agents from this PCAP file and coordinate the conversations accordingly. These agents may then: re-fragment these data packets based on real-time network traffic and network and asset configurations; and transmit these packet fragments—that differ in payload, etc. from analogous packet fragments transmitted between machines on the second network during the previous attack—to corresponding agents during the attack emulation, thereby creating an authentic, innocuous facsimile of the attack occurring on the target network.

For example, the computer system 102 can reconstruct actual data—such as including commands and files—distributed between machines internal and external to the second network during the previous attack on the second network to form a set of discrete data packets. The computer system 102 can then configure an attack emulation on the target network by: allocating a set of agents—installed on assets internal and external to the target network—send and receive these data packets in order to reproduce the previous attack on the target network based on unique IP (and/or MAC) addresses of machines internal and external to the second network that were involved in the previous attack on the second network, as represented in the PCAP file; defining an attack emulation schedule (or a set of time- or action-based "triggers") for transmission of these data packets between these agents based on timestamps of packet fragments—containing analogous data—sent between machines internal and external to the second network during the attack on the second network, as represented in the PCAP file; and then coordinate these agents to send and receive these data packets according to this attack emulation schedule during an attack emulation on the target network. In this example, when a source agent within the target network (i.e., an "internal source agent") transmits an assigned data packet to a designated destination agent within the target network (i.e., an "internal destination agent") according to the attack emulation schedule, the source agent may necessarily transmit actual data that was transferred between two machines within the second network during the previous attack on the second network. This "emulation action" between the source and destination agents may therefore represent an authentic recreation of an analogous interaction between the two machines within the second network during the previous attack.

Thus, rather than fabricate or contrive data for transmission between assets on the target network in order to verify that security technologies and configurations on the target network, the computer system 102 can instead coordinate an attack emulation in which agents—within and external to the target network—send and receive data packets that are identical in essence to data (e.g., commands, files) transferred between machines during the attack on the second network. Accordingly, this attack emulation generates network traffic on the target network that is authentic and representative of real network traffic that might occur on the target network during such a similar real attack on the target network. Detection, prevention, and/or alerting events generated by security technologies deployed on the target network responsive to the attack emulation generally or to individual emulation actions within the attack emulation may therefore accurately predict whether these security technologies are currently configured to respond to a similar real attack on the target network.

Furthermore, each agent allocated for the attack emulation may be configured to: receive a data packet from another agent according to a emulation action; and execute a next emulation action (e.g., by sending a next data packet to another agent) according to the attack emulation schedule; but not to execute commands contained within data packets received from another agent during the attack emulation, thereby preventing incidental execution of malicious actions—from the original attack—on the target network. For example, the computer system 102 can compile a set of packet fragments stored within the PCAP file into a data packet that contains a command to open a particular port on a machine involved in the attack on the second network. During the attack emulation, a first agent sends this data packet—such as in the form of one or more packet fragments—to a second agent within the target network. However, the second agent is not configured to read inbound data packets, to extract commands from inbound data packets, or otherwise respond to commands within data packets inbound from other agents during the attack emulation. Therefore, while this data packet represents an authentic communication between two machines during the attack on the second network, a command or other malicious data contained within this data packet remains innocuous and inoperable at the agent as a function of the configuration of the agent.

Furthermore, because these agents on the target network are not configured to extract and respond to commands contained in data packets within the attack emulation, the computer system 102 can avoid verifying that an agent scheduled to receive a data packet within the attack emulation is executing on an asset of the same type, supporting the same port configurations, and/or supporting the same actions, etc. as the machine on the second network that received and responded to this same data packet during the attack on the second network. Such configuration of these agents within and external to the target network can thereby enable the computer system 102 to: configure the attack emulation with greater flexibility; generate and run multiple (or many) instances of the attack emulation with different combinations of agents sending and receiving these data packets; and thus verify that security technologies are configured to respond to a real, analogous attack throughout multiple (or many) different regions of the target network and by exploiting different types of assets in different regions of the target network.

2.1 Command-and-Control

Generally, the method S100 is described herein as executed by a computer system 102, an integration manager 104, and/or a set of internal agents installed on assets within the target network to emulate—on the target network—north-south network traffic representative of a previous command-and-control attack on another, different network.

However, the method S100 can additionally or alternatively be executed to emulate—on the target network—north-south and/or east-west network traffic representative of a previous data-leak or command-and-control attack on another, different network or on the target network itself.

2.2 Self-Contained Emulation Package

Additionally, the system 100 can execute Blocks of the method S100: to recombine packet fragments within the PCAP file to form the set of data packets representative of original "conversations" between machines during the previous attack; to designate a set of assets—within and outside of a target network but not configured to execute commands or extract other data contained within these data packets—to send and receive these data packets during an attack emulation on the target network; to generate an emulation schedule for transmission of these data packets between these source and destination assets; to generate a self-contained attack emulation package—such as an executable file—that includes the data packets and the attack emulation schedule; and to deploy this attack emulation package to an internal asset within the target network for execution.

Accordingly, the system 100 enables an operator: to load the attack emulation package on an internal asset—that excludes an (persistent) agent installed thereon—within the target network; and to configure this internal asset, upon execution of the attack emulation package at the internal asset, to execute steps of attack emulation on the target network, in coordination with the system 100, in which designated source agents transmit assigned data packets to designated destination agents according to the emulation schedule. Therefore, the system 100 can execute Blocks of the method 100 to enable verification of security technologies deployed on a broader range of internal assets (and/or target networks) by operators absent access permissions to install (or execute) an agent on the internal asset.

2.3 Example: Air-Gapped Network

In one example application, the system 100 executes Blocks of the method S100: to assign a first internal asset—within a target network exhibiting a network boundary (or an "air-gapped network"), the first internal asset within the network boundary—as a source asset to transmit a first data packet to a second external asset, outside of the target network and the network boundary, according to a first transmission trigger; and to generate an executable file including the first data packet and defining the first transmission trigger, the first data packet designating a source IP address of the first internal asset and a destination IP of the second external asset.

In this example application, upon loading and execution of the executable file at the internal asset, the system 100 executes Blocks of the method S100: to configure the internal asset—absent an agent installed on the internal asset—to execute an attack emulation on the target network by extracting the first data packet and the first transmission trigger from the executable file; to initiate transmission of the first data packet from the internal asset to the second external asset (e.g., across the network boundary); and to generate an event log indicating detection, prevention, and/or alert, by security technologies deployed on the target network, of this transmission of the first data packet.

Therefore, the system 100 can then execute Blocks of the method S100: to scan the event log for an event indicating prevention of the transmission of the first data packet across the network boundary; and to verify efficacy of these security technologies and/or the network boundary to prevent network communication—of an authentic analogous attack on the target network—across the network boundary based on whether these security technologies generated a prevention event related to the first data packet during this emulation.

3. Terminology

Generally, a "second network" is referred to herein as a computer network that was previously subject to a malicious attack, such as a command-and-control or data-leak attack.

Generally, a "machine" is referred to herein as a computing device—such as a server, a router, a printer, a desktop computer, or a smartphone—within or connected to the second network and that was involved in the malicious attack.

Generally, a "packet capture file" (hereinafter a "PCAP file") is referred to herein as a data file containing packet fragments interchanged between two machines—such as between two machines inside the second network or between one machine internal to the second computer network and a second machine outside of the second network—during the malicious attack on the second network. For example, an application programming interface installed on or interfacing with the second network can capture packet fragments transmitted between machines internal and external to the second network and related metadata during the malicious attack. The application programming interface can also capture metadata representative of these packet fragments, such as including: transmit times (or "timestamps"); source machine identifiers (e.g., IP or MAC addresses); destination machine identifiers; protocols (e.g., TCP, HTTP); packet payloads (or "lengths"); source and destination ports; request types (e.g., file requests, connection initiation and termination requests); and/or request response types (e.g., requests confirmed, requests denied, files sent). A security analyst or computer system 102 can then filter these packet fragments to remove packet fragments not related (or unlikely to be related) to the malicious attack. The application programming interface (or the computer system 102, etc.) can then compile the remaining packet fragments and metadata into the PCAP file that represents the malicious attack on the second network.

Generally, a "target network" is referred to herein as a computer network on which the malicious attack is emulated by "replaying" the PCAP file—according to Blocks of the method S100—in order to verify that security technologies deployed on the target network are configured to respond to (e.g., detect, prevent, or alert on) analogous attacks.

Generally, an "internal agent" is referred to herein as an asset—within the target network—loaded with attack emulation software and thus configured to execute steps of attack emulations on the target network. Similarly, an "external agent" is referred to herein as an asset—external to the target network (e.g., a remote server)—loaded with attack emulation software and thus configured to execute steps of attack emulation on the target network.

Generally, an "actor" is referred to herein as an internal or external agent selected—such as automatically by the computer system 102 or manually by security personnel—to execute a step of a particular attack emulation on the target network, such as by transmitting a data packet to another actor or receiving a data packet from another actor.

Generally, an "attack emulation" is referred to herein as a coordinated, time- or action-based interchange of data packets, derived from the PCAP file, between actors within and external to the target network to emulate the malicious attack—that previously occurred on the second network—on the target network.

Generally, an "emulation action" is referred to herein as a step or "stage" of an attack emulation in which a data packet is transferred from a source agent to a recipient agent according to a time- or action-based trigger derived from the PCAP file.

Generally, an "emulation action" is referred to herein as a step or "stage" of an attack emulation in which a data packet is transferred from a source agent to a recipient agent according to a time- or action-based trigger derived from the PCAP file.

Generally, an "executable file" is referred to herein as a package including data and instructions that, when executed by an asset (e.g., an asset within a target computer network), configures the asset to execute steps of attack emulations on the target network.

Generally, a "network boundary" is referred to herein as a physical and/or logical separation of a target network, such as a mechanism(s)—installed on the target network—that controls flow of network communication into and/or out of the target network. For example, a target network exhibiting a network boundary (or an "air-gapped network") can: include internal assets within the target network; permit network communication between these internal assets within the network boundary of the target network; and prevent network communication—across the network boundary—between internal assets and external assets outside of the target network and/or the network boundary.

4. System

Figure 3:
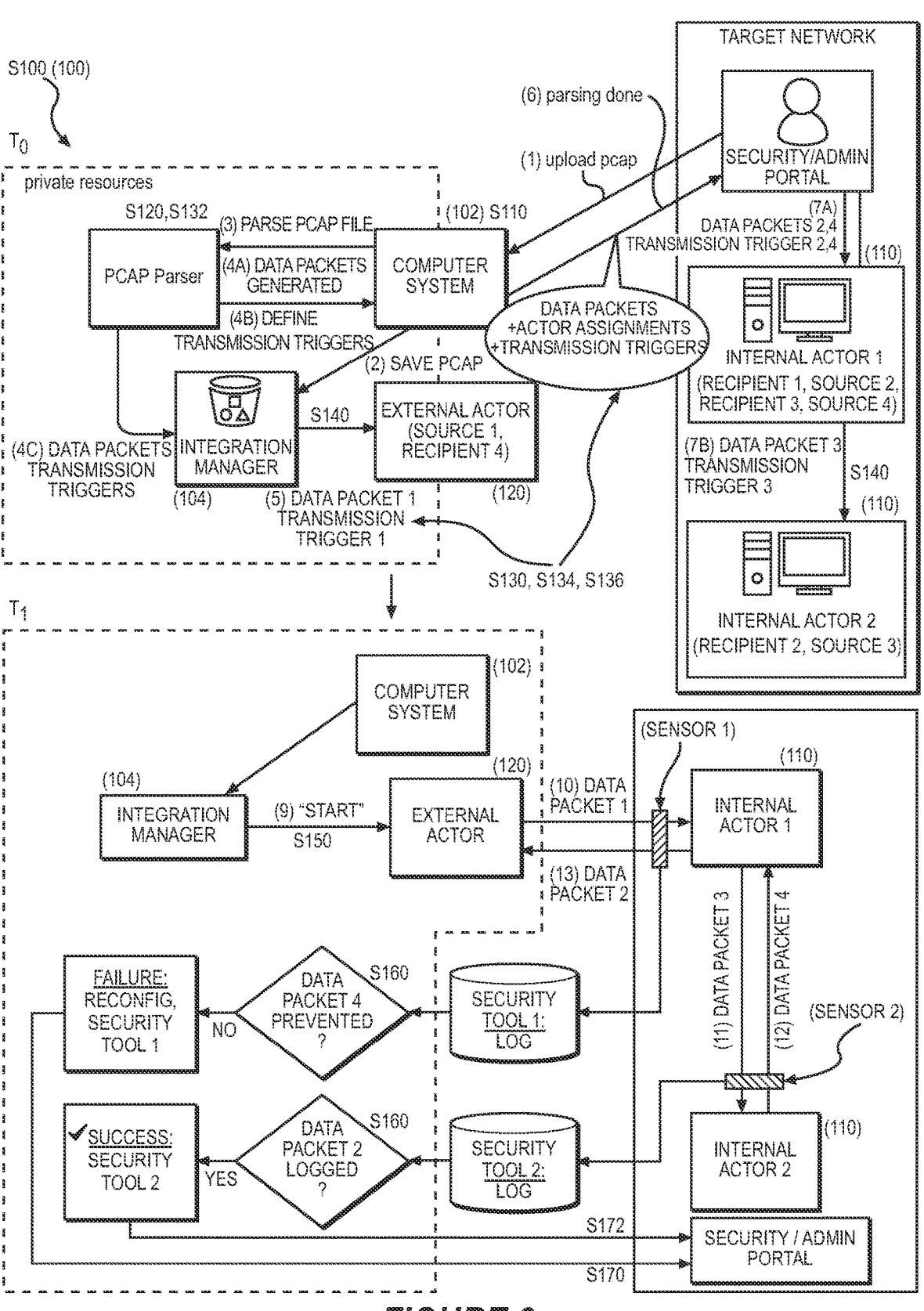
FIG. 3 is a flowchart representation of one variation of the method.

As shown in FIG. 3, the computer system 102 can interface with (or includes): an integration manager 104; a set of internal agents installed on assets (or "machines") within the target network; and an external agent(s) installed on an asset outside of the target network.

4.1 Integration Manager

In one implementation, when the method S100 is enabled on the target network, an administrator or other affiliate of the target network: installs an instance of an integration manager 104 on a machine within the target network; and supplies login information or other credentials for security technologies (e.g., direct and aggregate network threat management systems) installed or enabled across the target network or at particular assets within the target network. The integration manager 104 can then: load plugins for these security technologies; automatically enter login information or other credentials supplied by the administrator in order to gain access to event logs generated by these security technologies responsive to activity detected on the target network; and retrieve current settings and configurations of these security technologies within the target network, such as whether these security technologies are active and whether active security technologies are configured to detect, prevent, or alert on certain network activities or attacks more generally.

Later, the integration manager 104 can execute Blocks of the method S100 to define, configure, schedule, and then coordinate emulation actions within the attack emulation on the target network.

4.2 Internal Agent

The computer system 102 also coordinates execution of emulation actions by internal agents within the target network during the attack emulation.

In one implementation, an internal agent includes an asset (e.g., an internal server, a printer, a desktop computer, a smartphone, a router, a network switch): within the target network; and loaded with an attack emulation software configured to send and receive data packets according to emulation actions within an attack emulation generated by the computer system 102.

In particular, an internal agent can: load a data packet generated from a set of packet fragments extracted from the PCAP file and corresponding to a emulation action; detect or receive a trigger, such as receipt of a command from the integration manager 104, receipt of a data packet from another internal or external agent, or expiration of an internal timer; and then transfer the data packet—such as in its entirety or over a sequence of packet fragments based on real-time traffic, bandwidth, and configuration of the target network—to a designated destination agent within or external to the target network according to the emulation schedule.

4.3 Internal Agent

Similarly, the computer system 102 coordinates execution of emulation actions by external agents outside of the target network during the attack emulation.

In one implementation, an external agent includes an asset (e.g., an external server): outside of the target network; loaded with the attack emulation software; and configured to emulate a malicious external actor during a network attack.

5. PCAP File

Block S110 of the method S100 recites accessing a PCAP file representing packet fragments transmitted between machines within and external to a second network during an attack on the second network during a first time period. Generally, in Block S110, the computer system 102 can access a PCAP file generated during an attack on the second network according to full packet capture (or "FPC") techniques. More specifically, in Block S110, the computer system 102 can access a PCAP file that includes a population of packet fragments that represent packet interchanges between hosts (e.g., "machines") within and external to the second network during the malicious attack on the second network at an earlier time.

For example, an attack on the second network may generate network traffic between machines inside of the second network and a machine outside of the second network (e.g., a malicious external actor). A PCAP file generated during this attack may thus contain actual packet fragments transmitted between these internal machines and the external machine during the attack. The PCAP file may also contain metadata representative of each packet fragment, such as including: a transmit time (or "timestamp"); a source machine identifier (e.g., an IP or MAC address); a destination machine identifier (e.g., an IP or MAC address); a protocol (e.g., TCP, HTTP); a packet payload (or "length"); source and destination ports; a request type (e.g., file requests, connection initiation and termination requests); and/or a request response type (e.g., request confirmed, request denied, file sent).

In particular, the PCAP file may include a set of packet fragments that together represent a single data packet—sent from a source machine to a destination machine during the attack on the second network—containing a command, a request, or a file. The payload (i.e., the size, the length) of an individual packet fragment represented in the PCAP file may be a function of real-time network traffic, network bandwidth, and/or network configuration, etc. at the second network when the corresponding source machine transmitted the packet fragment to a corresponding destination machine. Therefore, transmission of this data packet within, to, or out of the second network at a particular time during the attack may be unique to the second network at this particular time.

In one implementation, after the attack is detected on the second network and characterized, such as by an external security technology, the computer system 102 (or a supplier of the PCAP file) can: estimate a time period of the attack on the second network; access a global PCAP file representing traffic on the second network over time; extract a subset of packet fragments associated with timestamps that intersect the time period of the attack; filter this subset of packet fragments by source and destination machines that were and/or that may have been involved in the attack; and aggregate these packet fragments and related metadata in a PCAP file for the attack. The computer system 102 can then retrieve this PCAP file in Block S110.

6. Data Packet Reconstruction

Block S120 of the method S100 recites recombining packet fragments within the PCAP file based on packet fragment metadata to generate a set of discrete data packets. Generally, in Block S120, the computer system 102 can recombine packet fragments contained within the PCAP file to generate a sequence of complete, discrete data packets that were transferred between machines—internal and external to the second network—during the attack on the second network. In particular, the computer system 102 can group discrete packet fragments by: source machine identifiers; destination machine identifiers; timestamp; packet payload; protocol; source and destination ports; request type; and/or request response type; etc. The computer system 102 can then compile groups of discrete packet fragments into complete data packets.

In one example, the computer system 102 extracts a corpus of packet fragments with metadata from the PCAP files and identifies a set of unique IP addresses represented in this corpus of packet fragments. The computer system 102 then: selects a first group of packet fragments in the PCAP file that designate a first IP address—in this set of unique IP addresses—as a source; and segments the first group of packet fragments into a first set of packet fragment subgroups, wherein each packet fragment subgroup designates one other IP address as a destination. The computer system 102 then: selects a first packet fragment subgroup—in this first set of packet fragment subgroups—designating a first destination IP address; and segments the first packet fragment subgroup into a first set of contiguous packet fragment clusters, wherein each packet fragment cluster contains packet fragments designating the same protocol, the same source and destination ports, the same request type, and/or the same request response type. Then, for a first packet fragment cluster in this first set of contiguous packet fragment clusters, the computer system 102: retrieves packet fragments in this first packet fragment cluster; sorts these packet fragments by timestamp; extracts data from these packet fragments; reassembles these packet fragments into a first data packet according to their timestamps; and labels the first data packet with a first time of the earliest timestamp of packet fragments in this first packet fragment cluster, the first source IP address, and the first destination IP address.

In this example, the computer system 102 then repeats this process for each other packet fragment cluster in this first set of contiguous packet fragment clusters to generate a first cluster of data packets, each labeled with: a time of the earliest timestamp of packet fragments in its corresponding packet fragment cluster; the first source IP address; and a destination IP address. The computer system 102 further repeats this process for each other packet fragment subgroup in the first set of packet fragment subgroups to generate a subgroup of data packets, each labeled with: a time of the earliest timestamp of packet fragments in its corresponding packet fragment cluster; a source IP address of its corresponding packet fragment cluster; and a destination IP address of its corresponding packet fragment cluster. The computer system 102 further repeats this process for each other group of packet fragments to generate a corpus of data packets, wherein each data packet is labeled with: a time of the earliest timestamp of packet fragments in its corresponding packet fragment cluster; a source IP address of its corresponding packet fragment cluster; and a destination IP address of its corresponding packet fragment cluster.

The computer system 102 can therefore group packet fragments—in the population of packet fragments extracted from the PCAP file—into a set of packet fragment clusters based on congruent addresses of source machines, congruent addresses of destination machines, and continuity of timestamps associated with packet fragments in this population of packet fragments. For each cluster of packet fragments in the set, the computer system 102 can then: define an order of packet fragments in the cluster of packet fragments based on timestamps of packet fragments in the cluster of packet fragments; and recombine the cluster of packet fragments into a singular packet fragment based on this order.

More specifically, the computer system 102 can: cluster packet fragments by packet fragment metadata stored in the PCAP file; and then compile data—extracted from one contiguous cluster of packet fragments—into one data packet labeled with a (relative or absolute) time that the packet fragment was transmitted from a particular source machine to a particular destination machine on the second network, an identifier of the particular source machine, and an identifier of the particular destination machine. This corpus of data packets may therefore represent multiple concurrent and/or serial "conversations"—normalized for network traffic, bandwidth, and configuration—between machines within and external to any network during an analogous attack.

6.1 Human-Readable Playbook

In one variation shown in FIG. 4, the computer system 102 can derive a human-readable summary of "conversations" represented in and reconstructed from the PCAP file and then present this summary to security personnel. For example, the computer system 102 can compress the set of data packets generated from the PCAP file—such as by removing an Open Systems Interconnection (or "OSI") data from these data packets and extracting remaining application, source and destination descriptors, and data packet sizes—to generate a short (or "minimum" set of high-level descriptions of the conversations between machines during the attack on the second network. The computer system 102 can then present this human-readable summary to the security personnel and enable the security personnel to manually assign source and destination actors and to define triggers to each conversation represented in this human-readable summary. The computer system 102 can then execute methods and techniques described below to distribute data packets and triggers to corresponding agents on the network and execute the attack emulation accordingly.

7. Agent Allocation

The computer system 102 can then designate internal and external agents as actors to send and receive data packets during playback of the PCAP file on the target network in Blocks S130, S134, and S136.

In one implementation, the computer system 102 scans the set of unique IP addresses represented in the PCAP file for: a first group of internal IP addresses of machines inside of the second network; and a second group of external IP addresses of machines external to the second network. Then, for a first internal IP address in the first group, the computer system 102: associates the first internal IP address with a first internal agent inside of the target network; and overwrites each source and destination IP address—in the corpus of data packets—specifying this first internal IP address with the IP address of the first internal agent. Similarly, for a second internal IP address in the first group, the computer system 102: associates the second internal IP address with a second internal agent inside of the target network; and overwrites each source and destination IP address—in the corpus of data packets—specifying this second internal IP address with the IP address of the second internal agent. The computer system 102 repeats this process for each other internal IP address in the first group.

Similarly, for a first external IP address in the second group, the computer system 102: associates the external IP address with a first external agent outside of the target network; and overwrites each source and destination IP address—in the corpus of data packets—specifying this first external IP address with the IP address of the first external agent. The computer system 102 repeats this process for each other external IP address in the second group.

Therefore, the computer system 102 can replace IP addresses—representative of machines within and connected to the second network during the previous attack—contained in the corpus of data packets with IP addresses of agents—within and connected to the target network—available for attack emulation.

7.1 Manual Agent Allocation

In a similar implementation, the computer system 102 can identify quantities of unique internal machines represented in the PCAP file and then prompt security personnel to manually assign this quantity of internal agents on the target network to attack emulation.

For example, the computer system 102 can automatically designate a dedicated external agent—installed on an asset external to the target network—for the emulation. The computer system 102 can then: identify a quantity of internal machines—within the second network—involved in the malicious attack on the second network based on addresses of source machines and addresses of destination machines associated with packet fragments represented in the PCAP file; allocate this quantity of internal agents—installed on assets within the target network—for the attack emulation; and prompt security personnel to manually select this quantity of internal agents for the attack emulation. In this example, the computer system 102 can: present a list of IP addresses of internal assets loaded with the attack emulation software or a map of internal assets within the target network to security personnel, such as via a security portal described below; and prompt the security personnel to select a quantity of these internal agents equal to the quantity of internal machines represented in the PCAP file.

The computer system 102 can then implement methods and techniques described above to assign these internal agents to send and receive data packets during the attack emulation.

Therefore, in this implementation, the computer system 102 can enable the security personnel to reconfigure (or "customize") replay of the PCAP file on different combinations of agents within and external to the network over time and to thus validate configuration of different security technologies at different combinations of assets across the network to fulfill response expectations to the same security threat represented in the PCAP file occurring in different locations and between different assets within the network.

7.2 Agent Allocation by Machine/Agent Characteristics

In one variation, when selecting the first internal agent to associate with the first internal IP address as in the foregoing implementation, the computer system 102 can predict a type of the first machine at the first internal IP address in the second network based on metadata of packet fragments—in the PCAP file—designating the first internal IP address as a source or destination, such as based on: ports designated in packet fragments inbound to the first machine; or file transfer commands confirmed by the first machine. The computer system 102 can then: identify an internal agent installed on an asset of the same or similar type within the target network; associate this internal agent with the first internal IP address in the PCAP file; and update source and destination IP addresses in the corpus of data packets accordingly. The computer system 102 can repeat for other internal and external IP addresses represented in the PCAP file.

In one implementation, the computer system 102 can identify a set of internal machines—within the second network—involved in the malicious attack on the second network based on unique addresses (e.g., IP addresses) of source machines and destination machines associated with packet fragments represented in the PCAP file. The computer system 102 can then derive a set of characteristics of a first internal machine in this set from packet fragments and metadata in the PCAP file, such as: a transmit port; a receive port; an operating system; a machine type; file types of data stored in local memory; or network access permissions. The computer system 102 can then identify an internal asset—within the target network and loaded with an internal agent—that exhibits characteristics analogous (e.g., identical, similar, or nearest) to the set of characteristics of the first internal machine. For example, the computer system 102 can weight characteristics of the first internal machine in order of: transmit and receive port; machine type; operating system; network access permissions; and finally local memory file types. The computer system 102 can then score each internal asset in the target network according to similarity to characteristics of the first internal machine, adjusted by weight of these characteristics. The computer system 102 can repeat this process for each other internal machine in the set to derive characteristics of these other internal machines and then score internal assets in the target network by similarity to characteristics of each of the internal machines. Finally, the computer system 102 can select: a combination of internal assets on the target network—including one internal asset per internal machine represented in the PCAP file—that maximizes the aggregate score of this combination of internal assets; link each internal asset in this combination to a corresponding internal machine represented in the PCAP file; and designate each of these internal assets as actors to emulate its corresponding internal machine during the attack emulation on the target network.

Therefore, in this variation, the computer system 102 can associate internal assets/agents in the target network with internal machines represented in the PCAP file based on similarity of certain characteristics such that emulation actions within the attack emulation on the target network are executed by internal assets that represent likely attack vectors for a similar, real attack on the target network.

Conversely, to minimize security risk that a data packet within the attack emulation may pose to an internal asset/agent designated as an actor in the attack emulation (e.g., by ensuring that a recipient agent is not configured to execute a command contained in a data packet received from another agent during the attack emulation on the target network), the computer system 102 can associate internal machines represented in the PCAP file with dissimilar internal assets on the target network. For example, the computer system 102 can select: a combination of internal assets on the target network—including one internal asset per internal machine represented in the PCAP file—that minimizes the aggregate score of this combination of internal assets; link each internal asset in this combination to a corresponding internal machine represented in the PCAP file; and designate each of these internal assets as actors to emulate its corresponding internal machine during the attack emulation on the target network.

8. Emulation Schedule

The computer system 102 can then generate a schedule (or a set of time- or action-based triggers) for transmission of the corpus of data packets between these internal and external agents in Block S132.

8.1 Time-Based Triggers

In one implementation, the computer system 102: sorts the corpus of data packets by timestamp; calculates relative time offsets between consecutive data packets in the attack emulation based on these timestamps; and generates a schedule containing a sequence of relative timers based on these relative time offsets. For example, the computer system 102 can generate a first relative timer for transmission of a second data packet, which defines a duration equal to a time offset between the first data packet and the second data packet and is configured for activation upon receipt of confirmation that a first source agent for the first data packet transmitted the first data packet to a first destination agent within or outside of the target network. Similarly, the computer system 102 can generate a second relative timer for transmission of a third data packet, which defines a duration equal to a time offset between the second data packet and the third data packet and is configured for activation upon receipt of confirmation that a second source agent for the second data packet transmitted the second data packet to a second destination agent within or outside of the target network. Therefore, in this example, when the computer system 102 initiates the attack emulation, the computer system 102 can: initiate the second relative timer upon receipt of confirmation that the second source asset transmitted a second data packet to its second designated destination agent; and then transmit a command to the third source agent to transmit a third data packet to its third designated destination agent upon expiration of the second relative timer.

In another implementation, the computer system 102: sorts the corpus of data packets by timestamp; calculates absolute time offsets from the first data packet in the attack emulation to each other data packet in the attack emulation based on these timestamps; and generates a schedule containing a set of absolute timers based on these absolute time offsets. For example, the computer system 102 can generate: a first absolute timer for transmission of a second data packet, which defines a duration equal to a time offset between the first data packet and the second data packet; a second absolute timer for transmission of a third data packet, which defines a duration equal to a time offset between the first data packet and the third data packet; and a third absolute timer for transmission of a fourth data packet, which defines a duration equal to a time offset between the first data packet and the fourth data packet. Therefore, in this example, when the computer system 102 initiates the attack emulation, the computer system 102 can initiate each of these timers remotely and then serve a prompt to each source agent to transmit its next data packet to its designated destination agent when the corresponding timers expire. Alternatively, when the computer system 102 initiates the attack emulation, the computer system 102 can transmit durations of these timers to source agents assigned to corresponding data packets and trigger these source agents to initiate local timers for these timer durations. These source agents can then selectively transmit their next data packets to designated destination agents responsive to expiration of corresponding timers.

The computer system 102 can thus aggregate these time-based triggers into a schedule for internal and external agents—thus designated as source assets for data packets within the attack emulation—to send their assigned data packets to corresponding internal and external agents thus designated as destination assets for these data packets.

8.2 Action-Based Triggers

Additionally or alternatively, the computer system 102 can define action-based triggers for transmission of data packets between source and destination agents during the attack emulation.

In one implementation, the computer system 102: extracts a cascade of actions and responses between machines during the attack on the second network based on metadata contained in the PCAP file; defines action-based triggers for the corpus of data packets accordingly; and write these action-based triggers to corresponding data packets in the attack emulation. For example, the computer system 102 can interpret a sequence of behaviors on the second network from the PCAP file, including: transmission of a command (a first data packet) by a first machine to a second machine at a first time; transmission of a command (a second data packet) by the second machine to a third machine at a second time; transmission of a file (a third data packet) by the third machine to the first machine at a third time; and transmission of a response (a fourth data packet) by the third machine to the second machine at a fourth time. In this example, the computer system 102 can derive a set of action-based triggers from this sequence of behaviors, including: transmission of the first data packet by a first agent to a second agent at a start time triggered by the integration manager 104; transmission of the second data packet by the second agent to a third agent in response to receiving the first data packet; transmission of the third data packet by the third agent to the first agent in response to receiving the second data packet; and transmission of the fourth data packet by third agent to the second agent in response to transmitting the third data packet to the first agent. The computer system 102 can this write these action-based triggers to their corresponding data packets.

However, the computer system 102 can implement any other method or technique to define an order or schedule for transmission of data packets between the agents within and external to the target network during the attack emulation.

8.3 Digital Signature

In one variation, the computer system 102 can digitally sign each data packet in the attack emulation, such as to prevent tampering and/or to key a data packet to an action-based trigger for executing a next emulation action.

In one implementation, the computer system 102 can sign each data packet in the attack emulation with a digital private certificate, such as with Public Key Infrastructure, prior to deploying the attack emulation to the target network. In this example and as described below, upon receiving a signed data packet during the attack emulation, an agent can: read the signature on the data packet; identify the data packet as an action within the attack emulation; initiate a next emulation action (e.g., transmit a next data packet to another agent) succeeding receipt of the data packet according to the emulation schedule; and then discard the data packet without reading or executing commands with the data packet.

9. Target Response Type

Furthermore, the computer system 102 can designate a target response type for the attack emulation by one or a population of security technologies deployed on the target network, such as: detection (or "logging"); prevention; or alerting.

In one implementation, the computer system 102 (or the integration manager 104, a human operator) can: retrieve a service level agreement of a security technology deployed on the target network; extract a response type (e.g., detect, prevent, or alert) for a type of the attack—represented in the PCAP file—from the service level agreement; and set this response type as a target response type to the attack emulation by the security technology. In a similar implementation, the computer system 102 (or the integration manager 104, a human operator) can: retrieve a current configuration of the security technology; read a response type that the security technology is currently configured to execute for the type of the attack—represented in the PCAP file—from this current configuration; and set this response type as a target response type of the security technology for the attack emulation. The computer system 102 can repeat this process for other security technologies deployed on the target network to define a set (e.g., a matrix) of target response types by these security technologies to the attack emulation.

The computer system 102 can additionally or alternatively assign particular response types for transmission of individual data packets between source and destination agents during the attack emulation, such as based on: severity or risk to the target network posed by behaviors represented by transmission of an individual data packets between designated source and destination agents; and a current configuration or service level agreement of the security technology. The computer system 102 can repeat this process for other data packets in the attack emulation and for other security technologies deployed on the target network in order to generate a set (e.g., a "matrix") of target response types—by these security technologies—to transmission of data packets into, within, and/or out of the target network during the attack emulation.

10. Emulation Action

The computer system 102 can then combine a data packet with a source agent, a destination agent, and a time- or action-based trigger to define a "emulation action" within the attack emulation. The computer system 102 can also associate this emulation action with a protocol, a packet payload, source and destination ports, a request type, and/or request response type, etc. derived from the cluster of packet fragments—characteristic of this data packet—contained in the PCAP file. The computer system 102 can further associate this emulation action with a target response type by one or more security technologies deployed on the target network.

The computer system 102 can therefore: generate a set of emulation actions that, when executed by source agents—within and external to the target network—emulate behaviors representative of the previous attack on the second network; and define characteristics for verifying responses to these behaviors by security technologies deployed on the target network.

11. Attack Emulation Configuration

Block S140 of the method S100 recites uploading each data packet to its corresponding source agent for storage in local memory during a second time period succeeding the first time period. Generally, in Block S140, the computer system 102 can configure the set of assets to execute the attack emulation.

In one implementation, the computer system 102 schedules a start time for the attack emulation. Then, prior to the start time of the attack emulation, the computer system 102 distributes each data packet in the attack emulation to its corresponding source agent within or outside of the target network. In the implementation described above in which the computer system 102 defines relative or absolute time-based triggers for transmission of these data packets to their designated destination agents and in which source agents manage these time-based triggers internally, the computer system 102 also transmits definitions for these time-based triggers to their corresponding source agents when configuring the target network for the attack emulation. Additionally or alternatively, in the implementation described above in which the computer system 102 defines action-based triggers for transmission of these data packets to their designated destination agents, the computer system 102 transmits definitions for these action-based triggers to their corresponding source agents when configuring the target network for the attack emulation.

12. Attack Emulation

Block S150 of the method S100 recites initiating transmission of the set of discrete data packets from designated source agents to designated destination agents according to transmission correspond triggers to emulate the attack on the target network. Generally, at the scheduled emulation start time, the computer system 102 (or the integration manager 104) initiates the attack emulation on the target network in Block S150. During this emulation attack, source agents can transmit their assign data packets to designated destination agents within and external to the target network automatically according to time- and/or action-based triggers associated with these data packets or responsive to triggers distributed to these agents by the computer system 102 (or by the integration manager 104), as shown in FIGS. 1 and 3.

12.1 Action-Based Trigger

In one implementation, upon receipt of a "start" command from the integration manager 104, a first agent transmits a first data packet—stored locally at the first agent—to a second agent. Upon receipt of the first data packet from the first agent, the second agent transmits a second data packet—stored locally at the second agent—to a third agent according to a first action-based trigger associated within the second data packet. Upon receipt of the second data packet from the second agent, the third agent transmits a third data packet—stored locally at the second agent—to the first agent according to a second action-based trigger associated within the third data packet. Upon transmission of the third data packet to the first agent, the third agent transmits a fourth data packet—stored locally at the second agent—to the second agent according to a third action-based trigger associated within the fourth data packet.

For example, the computer system 102 can: recombine a first cluster of packet fragments, designating a first source address and a first destination address within the PCAP file, to generate a first data packet; and recombine a second cluster of packet fragments, designating a second source address and a second destination address within the PCAP file, to generate a second data packet in Block S120. In Block S132, the computer system 102 can then: assign a first transmit time, at a (absolute) scheduled start time of the emulation, to the first data packet; and assign a second transmit trigger, responsive to receipt of the first data packet, to the second data packet based on the PCAP file representing transmission of the second data packet succeeding transmission of the first data packet during the malicious attack on the second network. Later, during the attack emulation, a first agent—designated to a source agent for the first data packet—can transmit the first data packet to a second agent—designated as a recipient agent for the first data packet—at the first transmit time. In response to receipt of the first data packet, the second agent—designated as a source agent for the second data packet—can transmit the second data packet to the first agent (or to another recipient agent) according to the second transmit trigger.

12.2 Relative Time-Based Action

In another implementation, upon receipt of a "start" command from the integration manager 104, a first agent transmits a first data packet—stored locally at the first agent—to a second agent. Upon receipt of the first data packet from the first agent, the second agent: initiates a first timer for a first duration associated with a second data packet according to a second emulation action; and transmits the second data packet—stored locally at the second agent—to a third agent when the first timer expires. Upon receipt of the second data packet from the second agent, the third agent: initiates a second timer for a second duration associated with a third data packet according to a third emulation action; initiates a third timer for a third duration associated with a fourth data packet according to a third emulation action; transmits the third data packet—stored locally at the third agent—to the first agent when the second timer expires; and transmits the fourth data packet—stored locally at the third agent—to the second agent when the third timer expires.

For example, the computer system 102 can: recombine a first cluster of packet fragments, designating a first source address and a first destination address within the PCAP file, to generate a first data packet; and recombine a second cluster of packet fragments, designating a second source address and a second destination address within the PCAP file, to generate a second data packet in Block S120. The computer system 102 can then: define a scheduled or manually-initiated start of the emulation as a first trigger for transmission of the first data packet during the attack emulation; extract a time offset between the first cluster of packet fragments and the second cluster of packet fragments based on timestamps of packet fragments represented in the PCAP file (e.g., based on a time difference between a timestamp of the first packet fragment in the first cluster of packet fragments and a timestamp of the first packet fragment in the second cluster of packet fragments); and then assign a second time-based transmit trigger for the second data packet succeeding transmission of the first data packet by the time offset.

Thus, in this example, a first source agent—assigned to the first data packet—can transmit the first data packet to a first recipient agent in response to initiation of the attack emulation; and the computer system 102 can scan (e.g., in real-time or following conclusion of the attack emulation) a log of a security technology deployed on the network for a first security event representing transmission of data from the first source agent to the first recipient proximal this start time (e.g., up to one second before and five seconds after initiation of the attack emulation). The first recipient agent—also designated as the second source agent for the second data packet—can then transmit the second data packet to a second recipient agent at the second transmit time; and the computer system 102 can scan the log of the security technology for a second security event representing transmission of data from the second source agent to the second recipient agent proximal the second transmit time (e.g., up to one second before and five seconds after transmission of the first data packet from the first agent to the second agent).

12.3 Absolute Time-Based Action

In yet another implementation, upon transmitting a "start" command to a first agent designated as a machine for a first data packet, the integration manager 104 activates a set of timers according to absolute time offsets between the first data packet and subsequent data packets in the attack emulation. Upon receipt of the "start" command from the integration manager 104, the first agent transmits the first data packet—stored locally at the first agent—to a second agent. Upon expiration of each subsequent timer in the set of timers, the integration manager 104 transmits a "transmit" command to a corresponding agent, which then transmits the corresponding data packet—stored locally at the agent—to a designated destination agent.

For example, the computer system 102 can: recombine a first cluster of packet fragments, designating a first source address and a first destination address within the PCAP file, to generate a first data packet; and recombine a second cluster of packet fragments, designating a second source address and a second destination address within the PCAP file, to generate a second data packet in Block S120. The computer system 102 can then: assign a first transmit time—at a scheduled start time of the emulation—to the first data packet; extract a time offset between the first cluster of packet fragments and the second cluster of packet fragments based on timestamps of packet fragments represented in the PCAP file; and then assign a second transmit time—succeeding the first transmit time by the time offset—to the second data packet.

However, the integration manager 104 can coordinate transmission of data packets between source and destination agents within and external to the target network according to any other schema during the attack emulation.

13. Security Technology Event Data Access and Association

Block S160 of the method S100 recites monitoring a set of security technologies, deployed on the target network, for security events related to the emulation. Generally, in Block S160, the computer system 102 can monitor security event logs of security technologies deployed to the target network for security events responsive to the attack emulation.

In particular, once the attack emulation is deployed and initiated on the target network at the start time, the computer system 102 (or the integration manager 104 more specifically) can monitor security event data written to logs published by security technologies deployed on the target network for responses to the attack emulation. The computer system 102 can continue to monitor these security logs for responses to the attack emulation (or to transmission of particular data packets between source and destination agents during the attack emulation) until conclusion of the attack emulation, such as: upon receipt of confirmation that a source agent sent a last data packet to its designated destination agent; or upon expiration of a last absolute or relative timer for these data packets in the attack emulation.

In one implementation, while this attack emulation is in process on the target network, the computer system 102 can scan security event logs published by these security technologies for detection, prevention, or alert events designating metadata of known emulation actions within the attack emulation, such as: IP addresses of source and/or destination agents; a protocol; a packet payload; source and destination ports; request types; and request response types characteristic of known emulation actions within the attack emulation. For example, the computer system 102 can associate detection, prevention, and alert events in these security event logs with particular emulation actions within the attack emulation based on: correspondence between known transmission types of data packets by source agents and detection, prevention, and alert event times; and correspondence between source IP addresses, destination IP addresses, protocols, packet payloads, source and destination ports, request types, and request response types, etc. characteristic of known emulation actions and corresponding metadata captured in detection, prevention, and alert event published in these security event logs.

14. Security Technology Validation

Block S170 of the method S100 recites, in response to absence of security events related to the emulation, generating a prompt to reconfigure the set of security technologies to respond to the attack. Generally, in Block S170, the computer system 102 can: compare detection, prevention, and alert events thus associated with the emulation action to target response types assigned to these emulation actions or to the attack emulation more generally in order to validate a current configuration of security technologies deployed to the target network; and then selectively prompt investigation and reconfiguration of these security technologies responsive to failure of these security technologies to respond to the attack as planned.

Figure 2:
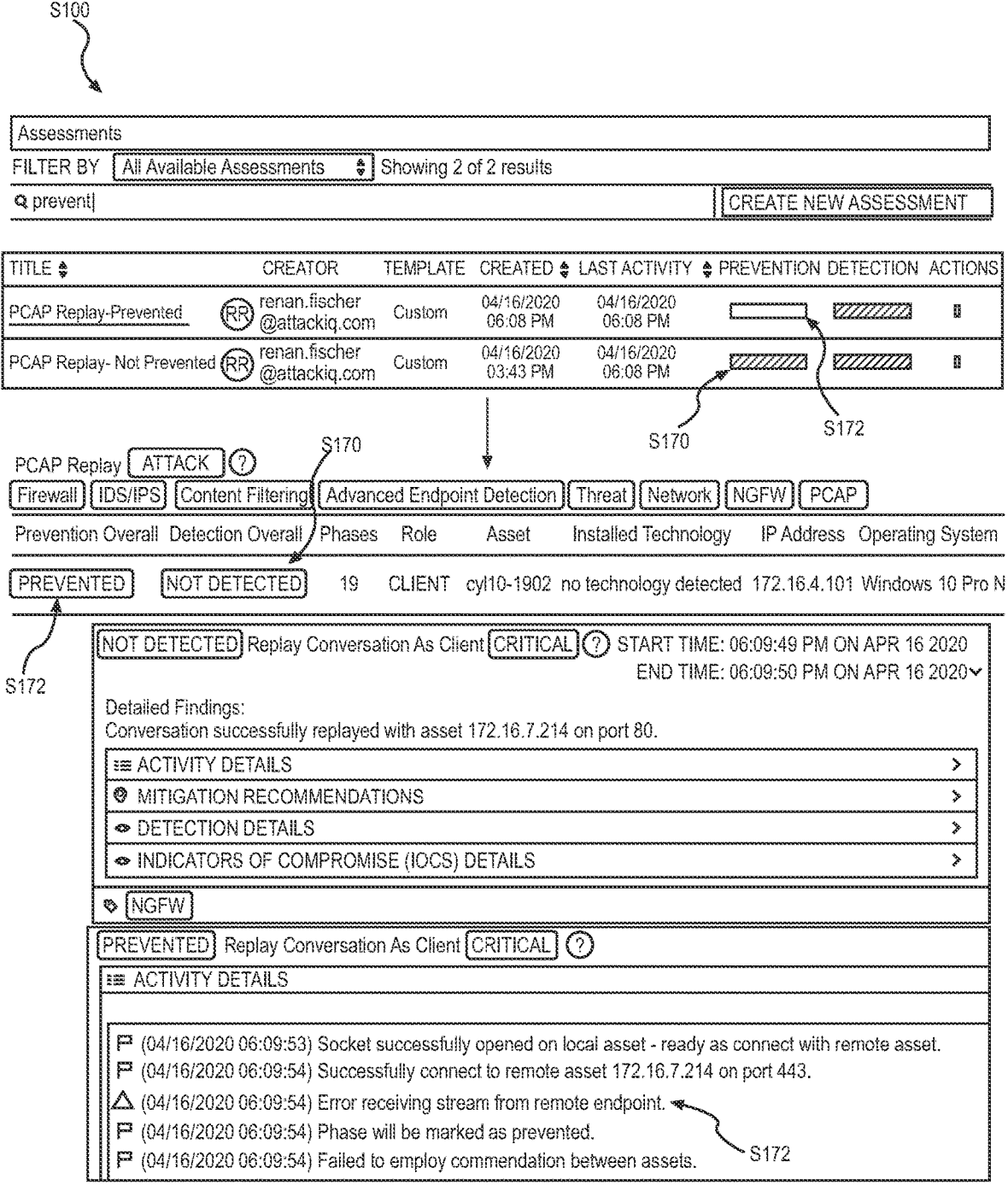
FIG. 2 is a graphical representation of one variation of the method.

In one implementation shown in FIGS. 2 and 3, for each emulation action in the attack emulation, the computer system 102 verifies that at least one security technology (or a particular security technology) detected, prevented, or alerted on the emulation action according to a response type assigned to this emulation action; if not, the computer system 102 flags these security technologies (or the particular security technology) for investigation and reconfiguration. Additionally or alternatively, the computer system 102 can verify that at least one security technology (or an particular security technology) detected, prevented, or alerted on the attack emulation as a whole according to a response type assigned to this attack emulation; if not, the computer system 102 can flag these security technologies as not properly configured to respond to an analogous attack on the target network and prompt further investigation and reconfiguration of these security technologies accordingly.

For example, the computer system 102 can return these validation results to a security portal—accessible by security personnel—within a native application or web browser executing on a personal computing device. The security portal can then: render a list of emulation actions within the attack emulation; label each of these emulation actions with identifiers of assigned source and destination agents; indicate responses by deployed security technologies on the target network to these emulation actions; and label each emulation attack with its corresponding validation result. The security portal can also highlight or flag each individual emulation action that failed to yield a target response by at least one security technology and/or indicate whether these security technologies failed to produce a target global response to the attack emulation. However, the integration manager 104 and the security portal can present validation results for the attack emulation to security personnel in any other format in order to alert security personnel to a need to reconfigure or redeploy security technologies to the target network in order to detect and respond to future attacks analogous to the previous attack on the second network.

14.1 Multiple Target Responses Per Security Technology

One variation of the method S100 includes: scanning a log of a security technology, deployed on the target network, for a security event related to a first data packet in the set of data packets and for a second security event related to a second data packet in the set of data packets in Block S160; in response to presence of the security event in the log, confirming configuration of the security technology to respond to a first stage of the malicious attack corresponding to the first data packet in Block S172; and, in response to absence of the second security event in the log, generating a prompt to reconfigure the security technology to respond to a second stage of the malicious attack corresponding to the second data packet in Block S170. Generally, in this variation, the computer system 102 (or security personnel, a service level agreement, etc.) can designate a particular security technology deployed on the network to detect, prevent, or alert on multiple stages of the attack emulation (e.g., transmission of multiple data packets between internal and external actors within the target network). Accordingly, in this variation, the computer system 102 can: scan a log of this security technology for detection (or "logging") and prevention events related to transmission of these data packets during the attack emulation; and similarly scan an alert feed published by the security technology for alerts related to transmission of these data packets during the attack emulation.

In one example, the computer system 102 recombines a first cluster of packet fragments—designating a first source address and a first destination address within the PCAP file—to generate a first data packet in Block S120. The computer system 102 then assigns a first target "prevention" response—by a security technology deployed on the network—to the first data packet during the attack emulation.

Similarly, in this example, the computer system 102 recombines a second cluster of packet fragments—designating a second source address and a second destination address within the PCAP file—to generate a second data packet in Block S120. The computer system 102 also assigns a second target "alert" response—by the security technology—to the second data packet during the attack emulation.

During subsequent execution of the attack emulation, a first agent initiates transmission of the first data packet to a second agent according to a first transmission trigger; and the second agent similarly initiates transmission of the second data packet to a third agent (or back to the first agent) according to a second transmission trigger.

During or upon completion of the attack emulation, the computer system 102 scans the log of the security technology for a security event indicating prevention of a transmission from the first agent to the second agent during a period of the attack emulation in Block S160. (Upon detecting this security event in the log, the computer system 102 can also verify that the security event corresponds to the first data packet based on a digital signature, indicators of compromise, or other data representative of the first data packet in the security event.) Upon detecting or confirming the security event in the log, the computer system 102 can confirm that the security technology is functioning as planned during the attack emulation and is therefore properly configured. Conversely, in response to absence of a security event indicating prevention of transmission of the first data packet during the attack emulation, the computer system 102 can: determine that the security technology did not function as planned during the attack emulation; and thus generate a first prompt to reconfigure the security technology to prevent network traffic—analogous to the first data packet—on the target network, as shown in FIG. 2.

(Additionally or alternatively, the computer system 102 can verify that a security technology—such as the target security technology or another security technology deployed on the network—prevented transmission of the first data packet from the first agent to the second agent during the first stage of the attack emulation if a first actor log at the first agent indicates failure to transmit the first data packet to the second agent and/or if a second actor log at the second agent indicates failure to receive the first data packet from the second agent, as shown in FIG. 2.)

The computer system 102 similarly scans the log of the security technology (or a separate alert feed published by the security technology) for a security alert prompting investigation of a second transmission from the second agent to the third agent during the period of the attack emulation in Block S160. (Upon detecting this security alert in the log or separate alert feed, the computer system 102 can also verify that the security alert corresponds to the second data packet based on a digital signature, indicators of compromise, or other data representative of the second data packet in the security alert.) Upon detecting or confirming the security alert in the log or separate alert feed, the computer system 102 can confirm that the security technology is functioning as planned during the attack emulation and is therefore properly configured. Conversely, in response to absence of a security alert related to the second data packet, the computer system 102 can: determine that the security technology did not function as planned during the attack emulation; and thus generate a second prompt to reconfigure the security technology to generate alerts responsive to network traffic—analogous to the second data packet—on the target network.

14.2 Target Responses Across Multiple Security Technologies

A similar variation of the method S100 shown in FIG. 3 includes: scanning a first log of a first security technology, deployed on the target network, for a first security event related to a first data packet in the set of data packets in Block S160; in response to presence of the first security event in the first log, confirming configuration of the first security technology to respond to a first stage of the malicious attack corresponding to the first data packet in Block S172; scanning a second log of a second security technology, deployed on the target network, for a second security event related to a second data packet in the set of data packets in Block S160; and, in response to absence of the second security event in the second log, generating a prompt to reconfigure the second security technology to respond to a second stage of the malicious attack corresponding to the second data packet in Block S170.

Generally, in this variation, the computer system 102 can implement similar methods and techniques to designate multiple security technologies deployed on the network to detect, prevent, or alert on multiple stages of the attack emulation. Accordingly, in this variation, the computer system 102 can: scan logs of these security technologies for detection (or "logging") and prevention events related to transmission of these data packets during the attack emulation; and scan one or more alert feeds published by these security technologies for alerts related to transmission of these data packets during the attack emulation.

In this foregoing example, the computer system 102 recombines a third cluster of packet fragments—designating a third source address and a third destination address within the PCAP file—to generate a third data packet in Block S120. The computer system 102 also assigns a third target "detect" response—by a second security technology—to the third data packet during the attack emulation.

During subsequent execution of the attack emulation, the third agent initiates transmission of the third data packet to the second agent (or the first agent, etc.) according to a third transmission trigger (e.g., receipt of the second data packet from the second agent).

During or upon completion of the attack emulation, the computer system 102 scans a second log of the second security technology for a third security event indicating detection of a transmission from the third agent to the second agent during the period of the attack emulation in Block S160. (Upon detecting this third security event in the log, the computer system 102 can also verify that the third security event corresponds to the third data packet based on a digital signature, indicators of compromise, or other data representative of the third data packet in the third security event.) Upon detecting or confirming the third security event in the log, the computer system 102 can confirm that the second security technology is functioning as planned during the attack emulation and is therefore properly configured. Conversely, in response to absence of a security event indicating detection of transmission of the third data packet during the attack emulation, the computer system 102 can: determine that the second security technology did not function as planned during the attack emulation; and thus generate a third prompt to reconfigure the second security technology to detect network traffic—analogous to the third data packet—on the target network.

14.3 Emulation Failure

In one variation, the computer system 102 accesses and/or monitors: a first actor log of a first agent assigned to transmit a first data packet to a second agent; and a second actor log of the agent assigned to receive the data packet from the first agent. If the first actor log indicates failure to transmit the first data packet to the second agent and/or if the computer system 102 second actor log of the second agent indicates failure to receive the first data packet from the second agent, the computer system 102 can flag this first data packet. The computer system 102 computer network can then query a log of the security technology and/or logs of other security technologies deployed on the security technology for prevention events correlated with transmission of the first data packet from the first agent to the second agent. In response to verifying that at least one of the security technologies logged a prevention event for transmission of the first data packet from the first agent to the second agent, the computer system 102 can confirm that the transmission failure represented in the first actor log or receive failure represented in the second actor log was caused by an action executed by a security technology deployed on the network.

Conversely, in response to determining that no security technology deployed on the network logged a prevention event for transmission of the first data packet from the first agent to the second agent, the computer system 102 can predict that a system failure prevented transmission of the first data packet from the first agent to the second agent, such as an endpoint firewall or another device located between the first and second agents on the network. In response to detecting a system failure, the computer system 102 can then: serve a prompt to security personnel to reconfigure an endpoint firewall or other device between the first and second actors before redeploying the attack emulation to the same combination of actors within and external to the network; and/or implement methods and techniques described herein to select an alternate combination of actors to execute the attack emulation and redeploy the attack emulation on the network accordingly.

15. Re-Emulation

Over time, the computer system 102 can repeat the foregoing methods and techniques to: assign a different combination of internal and external agents as sources and destinations for the corpus of data packets in the attack emulation; modify time- and/or action-based triggers for transmission of these data packets between the source and destination agents; compile these configurations into additional, unique variations of the attack emulation; deploy and execute these additional variations of the attack emulation on the target network; (re)validate the security technologies deployed on the target network detect, prevent, and/or alert on individual emulation actions or entire attack emulations more generally across these attack emulation variations; and selectively prompt investigation and reconfiguration of these security technologies accordingly.

In one implementation, the computer system 102 can automatically: generate a set of (e.g., ten, dozens) variations of the attack emulation; sequentially deploy these attack emulation variations to the target network over minutes, hours, or days; and validate responses by security technologies on the target network to these attack emulation variations. For example, a seemingly-trivial change to the target network or addition or removal of assets to or from the target network may enable two assets within the network to communicate. The computer system 102 can therefore execute regular reassessments of security technologies deployed on the target network to respond to attacks analogous to the malicious attack on the second network. Thus, in this example, the computer system 102 can automatically initiate an instance of the attack emulation: every five seconds, every minute, every hour, once per day, once per week, or once per month, etc.; on the same constellation of actors within and external to the target network; and/or on a prescribed, rotating, or pseudorandomly-assigned constellation of actors within and external to the target network.

Additionally or alternatively, the computer system 102 can initiate an instance of the attack emulation on-demand in response to a manual input by security personnel.

In another implementation, the computer system 102 can automatically deploy identical instances and/or variations of the attack emulation to the target network over time in response to reconfiguration of a security technology on the target network in order to verify whether this reconfiguration effected detection, prevention, or alerting on the attack emulation by the security technology. For example, the computer system 102 flags a security technology for failing to respond as planned or expected to a stage of a first instance of the attack emulation executed on the target network. Later, and following (or in response to) confirmation of reconfiguration of the security technology according to result of the first instance of the attack emulation, the computer system 102 initiates transmission of the same set of data packets between the same set of source and recipient agents according to the same transmission triggers in order to re-emulate the malicious attack on the target network with minimum changes from the previous instance of the attack emulation. The computer system 102 then implements methods and techniques described above: to rescan the log of the security technology for a security event related to re-emulation of the malicious attack on the target network; to confirm configuration of the security technology to respond to the malicious attack in response to presence of the second security event in the log; and/or to flag the security technology for further reconfiguration in response to absence of the second security event in the log.

15.1 Multiple Concurrent Emulations

In one variation, the computer system 102 executes multiple attack emulations—analogous to multiple different malicious attacks that previously occurred on multiple other networks—concurrently across multiple combinations of internal agents within the target network.

In this variation, the computer system 102 can also allocate the same external agent (e.g., the same server or remote computer) for these concurrent attack emulations. For example, the computer system 102 can allocate a single external agent executing on a single server or remote computer to function as analogous external attack vectors across multiple different attack emulations occurring within a single target network or across multiple target networks simultaneously.

16. Agentless Internal Asset

In one variation, as shown in FIG. 5, the computer system 102 interfaces with (or includes): an integration manager

104; an internal asset(s) 110 within a target network; and a pool of external assets 120 outside of the target network. Each external asset 120, in the pool of external assets 120, can include an external agent installed thereon. However, the internal asset 110 excludes an internal agent—loaded with attack emulation software and thus configured to execute steps of attack emulations on the target network—installed thereon.

17. Self-Contained Emulation Package

Generally, in Blocks S110, S120, S130, S132, S134, and S136, the computer system 102 can execute similar methods and techniques described above: to recombine packet fragments, within a PCAP file and representing data transmitted between machines in communication with a second computer network during a previous attack on the second computer network, to form a set of data packets representative of original "conversations" between these machines during the previous attack; to designate a set of assets— within and outside of a target network but not configured to execute commands or extract other data contained within these data packets—to send and receive these data packets during an attack emulation on the target network; and to generate an emulation schedule for transmission of these data packets between these source and destination assets.

Figure 6:
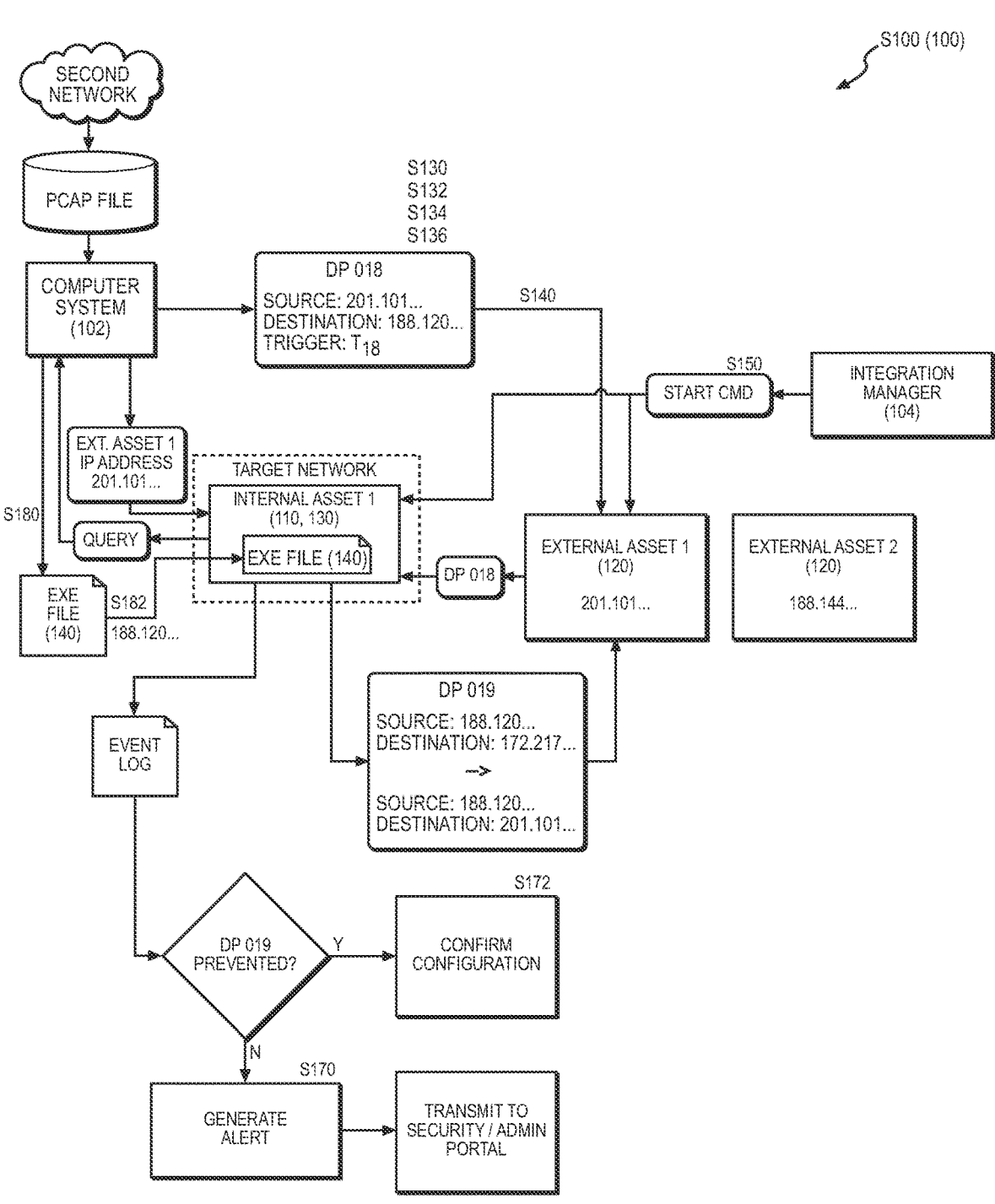
FIG. 6 is a flowchart representation of one variation of the method.
Figure 7:
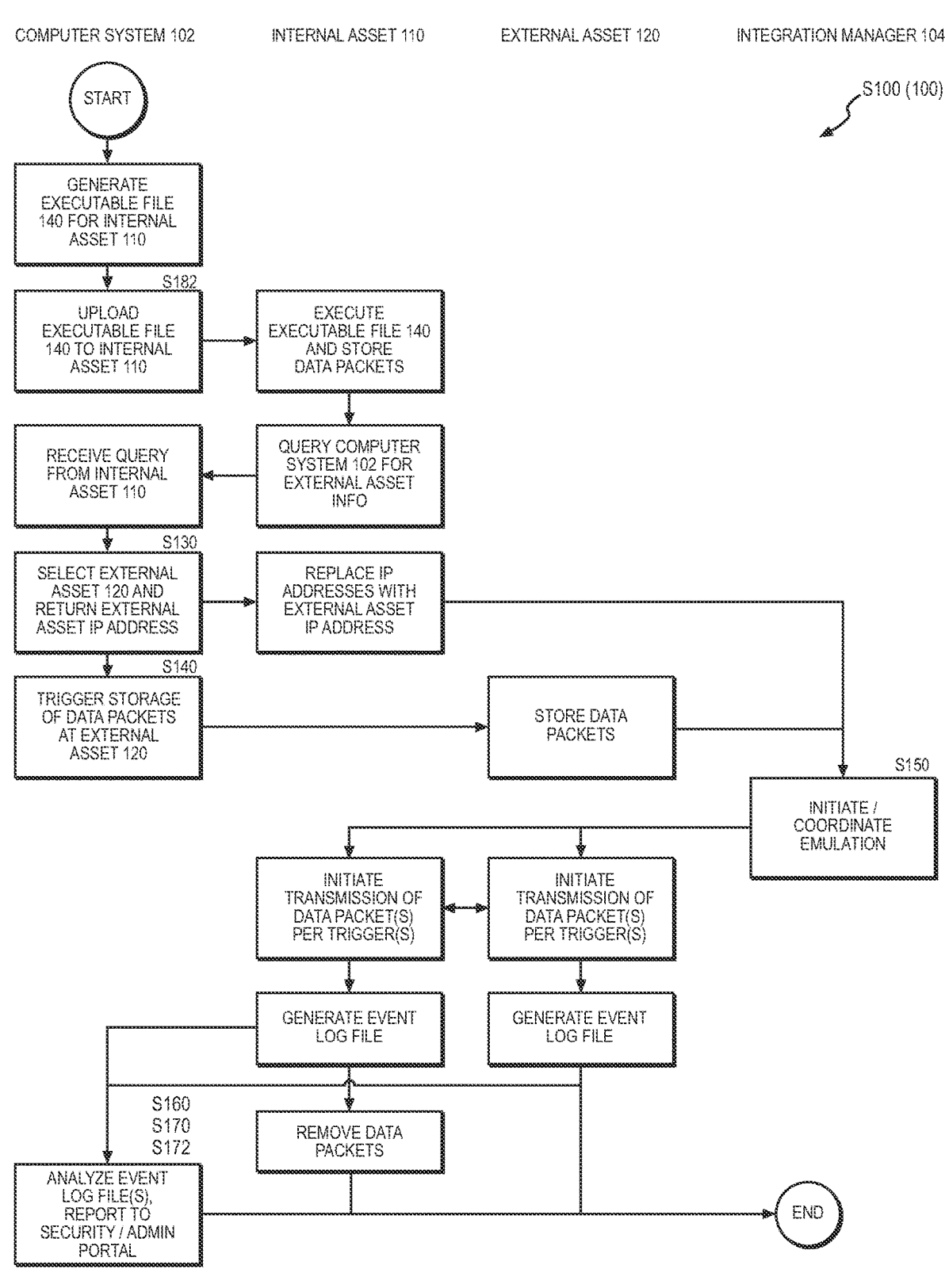
FIG. 7 is a flowchart representation of one variation of the method.

Additionally, the computer system 102 can: generate a self-contained attack emulation package—such as an executable file (or binary)—that includes the data packets and the attack emulation schedule in Block S180; and deploy this attack emulation package to the internal asset 110 within the target network in Block S182, as shown in FIGS. 5, 6, and 7. Therefore, the computer system 102 enables an operator: to load the attack emulation package on the internal asset 110—that excludes an internal agent installed thereon—within the target network; and to configure the internal asset 110, upon execution of the attack emulation package at the internal asset 110, to execute steps of attack emulation on the target network.

The computer system 102 can then execute the foregoing methods and techniques: to initiate an attack emulation in which designated source assets transmit assigned data packets to designated destination assets according to the emulation schedule in Block S150; to monitor security technologies installed on the target network for detection, prevention, and/or alert events in response to this emulation in Block S160; and to verify whether these security technologies deployed on the target network are properly configured to respond to an authentic analogous attack on the target network based on whether these security technologies generated detection, prevention, or alert events related to these data packets during this emulation in Blocks S170 and S172.

17.1 PCAP File and Data Packet Reconstruction

Generally, in Blocks S110 and S120, the computer system 102 can execute the foregoing methods and techniques: to access a set of data packets representing data transmitted between machines in communication with a second computer network during a malicious attack on the second computer network during a first time period; and select (or assign) a set of assets as actors in an emulation of the malicious attack on a target computer network.

In one example, the computer system 102 recombines a first cluster of packet fragments, transmitted between machines in communication with the second computer network during the malicious attack on the second computer network, within a PCAP file to generate a first data packet in the set of data packets. In this example, the computer system 102 can: group the first cluster of packet fragments, each packet fragment in the first cluster of packet fragments designating a first source address and a first destination address; define an order of packet fragments in the first cluster of packet fragments based on timestamps of packet fragments in the first cluster of packet fragments; and recombine the first cluster of packet fragments into the first data packet based on the order. The computer system repeats this process to generate each other data packet in the set of data packets.

17.2 Asset Allocation

Block S130 of the method S100 recites assigning a set of assets as actors in an emulation of the malicious attack on a target computer network. Blocks of the method S100 recite, for each data packet in the set of data packets: assigning a recipient asset, in the set of assets, to receive the data packet in Block S134; and assigning a source asset, in the set of assets, to transmit the data packet to the recipient asset according to the transmission trigger in Block S136.

Generally, the computer system 102 can execute similar methods and techniques to assign (or designate, select) internal and external assets as actors to send and receive data packets during playback of the PCAP file on the target network in Blocks S130, S134, and S136.

In one implementation, the computer system 102 can automatically designate a first internal asset 110 for the emulation.

In another implementation, the computer system 102 can identify quantities of unique external machines represented in the PCAP file and then assign this quantity of external assets 120, in the pool of external assets 120 and outside of the target network, to attack emulation.

In another implementation, the computer system 102 can identify a set of external machines—external to the second network—involved in the malicious attack on the second network based on unique addresses (e.g., IP addresses) of source machines and destination machines associated with packet fragments represented in the PCAP file. The computer system 102 can then derive a set of characteristics of a first external machine in this set from packet fragments and metadata in the PCAP file, such as: a transmit port; a receive port; an operating system; a machine type; file types of data stored in local memory; or network access permissions. The computer system 102 can then select an external asset 120—from the pool of external assets 120 external to the target network—that exhibits characteristics analogous (e.g., identical, similar, or nearest) to the set of characteristics of the first external machine. For example, the computer system 102 can weight characteristics of the first external machine in order of: transmit and receive port; machine type; operating system; network access permissions; and finally local memory file types. The computer system 102 can then score each external asset 120 in the pool of external assets 120 according to similarity to characteristics of the first external machine, adjusted by weight of these characteristics. The computer system 102 can repeat this process for each other external machine in the set to derive characteristics of these other external machines and then score external assets 120 in the pool of external assets 120 by similarity to characteristics of each of the external machines. Finally, the computer system 102 can select: a combination of external assets 120—including one external asset 120 per external machine represented in the PCAP file—that maximizes the aggregate score of this combination of external assets 120; link each external asset 120 in this combination to a corresponding external machine represented in the PCAP file; and designate each of these external assets 120 as actors to emulate its corresponding external machine during the attack emulation on the target network.

Alternatively, the computer system 102 can automatically designate a dedicated external asset 120—external to the target network—for the emulation.

17.2.1 Address Replacement

The computer system 102 can then execute the foregoing methods and techniques to replace addresses (e.g., IP addresses)—representative of machines involved in the malicious attack on the second network—contained in the set of data packets with addresses of assets designated and available for attack emulation.

In one implementation, the computer system 102 scans the set of unique IP addresses represented in the PCAP file for: a first group of internal IP addresses of machines inside of the second network; and a second group of external IP addresses of machines external to the second network. Then, for a first internal IP address in the first group, the computer system 102: associates the first internal IP address with a first internal asset 110 inside of the target network; and overwrites each source and destination IP address—in the set of data packets—specifying this first internal IP address with the IP address of the first internal asset 110. Similarly, for a second internal IP address in the first group, the computer system 102: associates the second internal IP address with a second internal asset 110 inside of the target network; and overwrites each source and destination IP address—in the corpus of data packets—specifying this second internal IP address with the IP address of the second internal asset 110. The computer system 102 repeats this process for each other internal IP address in the first group.

Similarly, for a first external IP address in the second group, the computer system 102: associates the external IP address with a second external asset 120 (or a second external agent) outside of the target network; and overwrites each source and destination IP address—in the set of data packets—specifying this first external IP address with the IP address of the second external asset 120. The computer system 102 repeats this process for each other external IP address in the second group.

In one example, for a first data packet designating (or specifying) a first source IP address associated with an internal machine within the second computer network and a first destination IP address associated with an external machine outside of the second computer network, the computer system 102: selects an external asset 120 as a recipient asset to receive the first data packet; selects the first internal asset 110 as a source asset to transmit the first data packet to the external asset 120; replaces the first source IP address, designated in the first data packet, with the IP address of the first internal asset 110; and replaces the first destination IP address, designated in the first data packet, with the IP address of the external asset 120.

In another example, for a second data packet designating a second source IP address associated with the external machine outside of the second computer network and a second destination IP address associated with the internal machine within the second computer network, the computer system 102: selects the first internal asset 110 as a recipient asset to receive the second data packet; selects the external asset 120 as a source asset to transmit the second data packet to the first internal asset 110; replaces the second source IP address, designated in the second data packet, with the IP address of the external asset 120; and replaces the second destination IP address, designated in the second data packet, with the IP address of the first internal asset 110.

17.2.2 Dynamic Asset Allocation and Address Replacement

In one variation, the computer system 102: automatically designates the first internal asset 110 for the emulation; and dynamically assigns (or selects) an external asset(s) 120, from the pool of external assets 120, for the emulation during runtime of the executable file at the first internal asset 110.

In this variation, the computer system 102 generates the executable file including instructions: to query the computer system 102 for IP addresses of external assets 120 designated as actors for the emulation; and to replace external source IP addresses and external destination IP addresses—represented in the set of data packets—with the IP addresses of these external assets 120.

In response to accessing and executing the executable file, the first internal asset 110 queries the computer system 102 for IP addresses of external assets 120 designated as actors for the emulation.

The computer system 102: receives the query from the first internal asset 110; and executes the foregoing methods and techniques to assign external assets 120, from the pool of assets 120, for the emulation. The computer system 102 can then: generate a message indicating IP addresses of these external assets 120; and transmit the message to the first internal asset 110. More specifically, the computer system 102 can generate the message exhibiting plain text format, thereby reducing risk of filtering and/or prevention of the message by security technologies deployed on the target network and/or the first internal asset 110.

In response to receiving the message, the first internal asset 110 executes similar methods and techniques to replace external source IP addresses and external destination IP addresses with the IP addresses of these external assets 120.

For example, in response to executing the executable file containing a first data packet designating a first external destination IP address, the first internal asset 110 can query the computer system 102 for a target IP address of a recipient asset (e.g., an external asset 120) to receive the first data packet.

In response to receiving the query from the first internal asset 110, the computer system 102 can: select a second external asset 120, from the pool of external assets 120, as an actor to emulate the external machine during the emulation of the malicious attack on the target network; generate a first message—exhibiting plain text format—a second IP address of the second external asset 120; and transmit the first message to the first internal asset 100.

In response to receiving the first message from the computer system 102, the first internal asset 110 can replace the first external destination IP address, designated in the first data packet, with the second IP address of the second external asset 120.

Therefore, the computer system 102 can dynamically assign the second external asset 120, from the pool of external assets 120, for the emulation—on-demand and based on availability of the second external asset 120—during runtime of the executable file at the first internal asset 110.

17.3 Emulation Schedule

Block S132 of the method S100 recites, for each data packet in the set of data packets, assigning a transmission trigger, in a set of transmission triggers, to the data packet based on transmission of corresponding data during the malicious attack on the second computer network.

Generally, in Block S132, the computer system 102 can execute the foregoing methods and techniques to generate a schedule (or a set of time- or action-based triggers) for transmission of the set of data packets between these internal and external assets.

17.3.1 Time-Based Triggers

In one implementation, the computer system 102 executes the foregoing methods and techniques: to sort the set of data packets by timestamp; calculate relative time offsets between consecutive data packets in the attack emulation based on these timestamps; and generate a schedule containing a sequence of relative timers based on these relative time offsets.

In another implementation, the computer system 102 executes the foregoing methods and techniques: to sort the set of data packets by timestamp; calculate absolute time offsets from the first data packet in the attack emulation to each other data packet in the attack emulation based on these timestamps; and generate a schedule containing a set of absolute timers based on these absolute time offsets.

For example, the computer system 102 can: define a first absolute time offset between a first data packet, in the set of data packets, and an emulation start time triggered by the integration manager 104; assign a first transmit time to the first data packet succeeding the emulation start time by the first absolute time offset; define a second absolute time offset between a second data packet, in the set of data packets, and the start time; and assign a second transmit time, succeeding the start time by the second time offset, to the second data packet. Therefore, in this example, when the computer system 102 initiates the attack emulation (e.g., based on a start command indicating the emulation start time), source assets can transmit data packets to designated destination assets when based on these transmit times. More specifically, the first internal asset 110—assigned as a source asset to transmit the second data packet to the second external asset 120—can: generate a first timer—defining a duration equal to the second absolute time offset—for transmission of the second data packet; initiate the first timer in response to the start command indicating the emulation start time; and transmit the second data packet to the second external asset 120 responsive to expiration of the first timer.

17.3.2 Action-Based Triggers

Additionally or alternatively, the computer system 102 can define action-based triggers for transmission of data packets between source and destination assets during the attack emulation.

In one implementation, the computer system 102 can execute the foregoing methods and techniques to: access the set of data packets representing behaviors of machines in communication with the second computer network during the malicious attack on the second computer network; and, for each data packet in the set of data packets, assign a behavior trigger, in a set of behavior triggers, to the data packet based on a corresponding behavior during the malicious attack on the second computer network.

For example, the computer system 102 can interpret a sequence of behaviors on the second network from the PCAP file, including: transmission of a command (a first data packet) by a first machine to a second machine at a first time; transmission of a command (a second data packet) by the second machine to a third machine at a second time; transmission of a file (a third data packet) by the third machine to the first machine at a third time; and transmission of a response (a fourth data packet) by the third machine to the second machine at a fourth time. In this example, the computer system 102 can derive a set of action-based triggers from this sequence of behaviors, including: transmission of the first data packet by a first asset to a second asset at a start time triggered by the integration manager 104; transmission of the second data packet by the second asset to a third asset in response to receiving the first data packet; transmission of the third data packet by the third asset to the first asset in response to receiving the second data packet; and transmission of the fourth data packet by the third asset to the second asset in response to transmitting the third data packet to the first asset. The computer system 102 can this write these action-based triggers to their corresponding data packets.

17.3.3 Digital Signature

In one variation, the computer system 102 can execute the foregoing methods and techniques to digitally sign each data packet in the attack emulation, such as to prevent tampering and/or to key a data packet to an action-based trigger for executing a next emulation action.

In one implementation, the computer system 102 can sign each data packet in the attack emulation with a digital private certificate, such as with Public Key Infrastructure, prior to deploying the attack emulation to the target network. In this example and as described below, upon receiving a signed data packet during the attack emulation, an asset can: read the signature on the data packet; identify the data packet as an action within the attack emulation; initiate a next emulation action (e.g., transmit a next data packet to another agent) succeeding receipt of the data packet according to the emulation schedule; and then discard the data packet without reading or executing commands with the data packet.

17.4 Executable File

Block S180 of the method S100 recites generating an executable file: including a first subset of data packets, in the set of data packets, to which the first internal asset 110 is assigned; defining a first subset of transmission triggers, in the set of transmission triggers, assigned to the first subset of data packets; and configured to selectively initiate transmission of the first subset of data packets, from the first internal asset 110 to recipient assets, in the set of assets, according to the first subset of data packets responsive to execution of the executable file at the first internal asset 110.

Generally, in Block S180, the computer system 102 can generate an executable file including data and instructions to configure the first internal asset 110—within the target network—to execute steps of attack emulation on the target network.

In one implementation, the computer system 102 generates the executable file including the set of data packets and the emulation schedule. More specifically, the computer system 102 can generate the executable file populated with: the set of data packets of the emulation; and a set of transmission triggers (and/or behavior triggers) assigned to the set of data packets.

Additionally, the computer system 102 can generate the executable file storing instructions (or commands) that, when executed by the first internal asset 110, cause the first internal asset 110: to identify a first subset of data packets, in the set of data packets, to which the first internal asset 110 is assigned as a source asset; to identify a first subset of transmission triggers, in the set of transmission triggers, assigned to the first subset of data packets; and to selectively initiate transmission of data packets—in the first subset of data packets—according to the first subset of transmission triggers during the emulation.

In one variation, the computer system 102: identifies the first subset of data packets to which the first internal asset 110 is assigned as a source asset; and identifies the first subset of transmission triggers assigned to the first subset of data packets. The computer system 102 can then generate the executable file: including the first subset of data packets; and defining the first set of transmission triggers.

For example, the computer system 102 can: assign a first transmit time to a first data packet in the set of data packets; assign a second external asset 120 to receive the first data packet; assign the first internal asset 110 to transmit the first data packet to the second external asset 120 according to the first transmit time; and replace a first source IP address, designated in the first data packet, with the IP address of the first internal asset 110. In this example, the computer system 102 can: identify a first subset of data packets—in the set of data packets and to which the first internal asset 110 is assigned as a source asset—including the first data packet; identify a first subset of transmission triggers including the first transmit time; and generate the executable file including the first subset of data packets and the first subset of transmission triggers.

Accordingly, the computer system 102 can generate the executable file including a subset of data packets, in the set of data packets, for transmission by the first internal asset 110 during the emulation—rather than the set of data packets in entirety—thereby reducing total file size of the executable file and reducing memory overhead during execution of the executable file at the first internal asset 110.

In another implementation, the computer system 102 can generate the executable file configured to: trigger storage of the first subset of data packets, from the executable file, in local memory of the first internal asset 110 (e.g., during a first time period preceding initiation of the emulation); and trigger removal of the first subset of data packets from local memory of the first internal asset 110 (e.g., during a second time period succeeding completion of the emulation).

17.5 Attack Emulation Configuration

Block S182 of the method S100 recites uploading the executable file to the first internal asset 110 during the time period.

Generally, in Blocks S140 and S182, the computer system 102 can execute the foregoing methods and techniques to configure the set of assets to execute the attack emulation. More specifically, the computer system 102 can trigger storage of each data packet to its corresponding source asset for storage in local memory.

In one implementation, in Block S182, the computer system 102 uploads the executable file to the first internal asset 110. For example, the computer system 102 can store the executable file to a data repository (e.g., a cloud storage volume) for loading onto the first internal asset 110.

Additionally or alternatively, the computer system 102 stores the executable file onto a removable memory storage device for (manual) loading onto the first internal asset 110. An operator may then: connect the removable memory storage device to the first internal asset 110; and load the executable file onto the first internal asset 110.

In this implementation, in response to executing the executable file, the first internal asset 110 stores the first subset of data packets, from the executable file and assigned to the first internal asset 110, in local memory of the first internal asset 110. Additionally, the first internal asset 110 extracts the first subset of transmission triggers—from the executable file—corresponding to the first subset of data packets.

In another implementation, the computer system 102 triggers storage of a subset of data packets, in the set of data packets and assigned to an external asset 120, in local memory of the external asset 120. For example, the computer system 102 can trigger storage of a second subset of data packets, in the set of data packets and assigned to the second external asset 120, in local memory of the second external asset 120. Additionally, the computer system 102 can transmit a second subset of transmission triggers, in the set of transmission triggers and corresponding to the second subset of data packets, to the second external asset 120.

17.6 Attack Emulation

Block S150 of the method S100 recites, during a second time period succeeding the first time period and in response to execution of the executable file at the first internal asset 110, initiating transmission of the set of data packets from source assets to recipient assets, in the set of assets, according to the set of transmission triggers to emulate the malicious attack on the target network.

Generally, the computer system 102 (or the integration manager 104) can execute the foregoing methods and techniques to initiate the attack emulation—at the emulation start time—on the target network. More specifically, the computer system 102 (or the integration manager 104) can initiate transmission of the set of data packets from source assets to recipient assets, in the set of assets, according to the set of transmission triggers to emulate the malicious attack on the target network. During this emulation attack, source assets can automatically transmit their assigned data packets to designated destination assets within and external to the target network according to time- and/or action-based triggers associated with these data packets responsive to triggers distributed to these assets by the computer system 102 (or by the integration manager 104).

17.6.1 Action-Based Trigger

In one implementation, upon receipt of a "start" command from the integration manager 104, a first asset transmits a first data packet—stored locally at the first asset—to a second asset. Upon receipt of the first data packet from the first asset, the second asset transmits a second data packet—stored locally at the second agent—to a third asset according to a first action-based trigger associated within the second data packet.

For example, the computer system 102 can: recombine a first cluster of packet fragments, designating a first source address and a first destination address within the PCAP file, to generate a first data packet; and recombine a second cluster of packet fragments, designating a second source address and a second destination address within the PCAP file, to generate a second data packet in Block S120. In Block S132, the computer system 102 can then: assign a first transmit time, at a (absolute) scheduled start time of the emulation, to the first data packet; and assign a second transmit trigger, responsive to receipt of the first data packet, to the second data packet based on the PCAP file representing transmission of the second data packet succeeding transmission of the first data packet during the malicious attack on the second network. Later, during the attack emulation, a second external asset 120—designated to a source asset for the first data packet—can transmit the first data packet to the first internal asset 110, designated as a recipient asset for the first data packet, at the first transmit time. In response to receipt of the first data packet, the first internal asset 110—designated as a source asset for the second data packet—can transmit the second data packet to the first asset (or to another recipient asset) according to the second transmit trigger. More specifically, the first internal asset 110 can transmit the second data packet to the first asset according to the second transmit trigger via an IP address—of the second external asset 120—designated in the second data packet stored in local memory of the first internal asset 110.

In one variation, in response to receipt of the first data packet, the first internal asset 110 can generate a first message indicating receipt of the first data packet from the second external asset 120; and transmit the first message to the computer system 102 (or the integration manager 104).

In response to receiving the first message from the first internal asset 110, the computer system 102 (or the integration manager 104) transmits a "transmit" command—corresponding to the second transmit trigger—to the first internal asset 110, which then transmits the second data packet to the first asset (or to another recipient asset) according to the second transmit trigger.

Therefore, in this variation, the computer system 102 (or the integration manager 104) can: track completion of an emulation action of the attack emulation; and trigger execution of a next emulation action according to the attack emulation schedule.

17.6.2 Time-Based Action

In another implementation, upon transmitting a "start" command to a first asset designated as a machine for a first data packet, source assets can locally initiate timers according to absolute time offsets between the first data packet (or the "start" command) and subsequent data packets in the attack emulation. Upon receipt of the "start" command from the integration manager 104, the first asset transmits the first data packet—stored locally at the first asset—to a second asset. Upon expiration of each timer at a source asset, the source asset transmits the corresponding data packet—stored locally at the source asset—to a designated destination asset.

For example, the computer system 102 can: recombine a first cluster of packet fragments, designating a first source address and a first destination address within the PCAP file, to generate a first data packet; and recombine a second cluster of packet fragments, designating a second source address and a second destination address within the PCAP file, to generate a second data packet in Block S120. The computer system 102 can then: assign a first transmit time—at a scheduled start time of the emulation—to the first data packet; extract a time offset between the first cluster of packet fragments and the second cluster of packet fragments based on timestamps of packet fragments represented in the PCAP file; and then assign a second transmit time—succeeding the first transmit time by the time offset—to the second data packet.

Thus, in this example, a first source asset (e.g., the second external asset 120)—assigned to the first data packet—can transmit the first data packet to a first recipient asset (e.g., the first internal asset 110) in response to initiation of the attack emulation; and the computer system 102 can scan (e.g., in real-time or following conclusion of the attack emulation) a log of a security technology deployed on the network for a first security event representing transmission of data from the first source asset to the first recipient asset proximal this start time (e.g., up to one second before and five seconds after initiation of the attack emulation). The first recipient asset—also designated as the second source asset for the second data packet—can then transmit the second data packet to a second recipient asset at the second transmit time; and the computer system 102 can scan the log of the security technology for a second security event representing transmission of data from the second source asset to the second recipient asset proximal the second transmit time (e.g., up to one second before and five seconds after transmission of the first data packet from the first asset to the second asset).

17.7 Security Technology Event Data Access and Association

Block S160 of the method S100 recites accessing a set of network event records generated by a security technology, deployed on the target computer network, during the second time period.

Generally, in Block S160, the computer system 102 can execute the foregoing methods and techniques to monitor (or access) security event logs of security technologies deployed to the target network for security events responsive to the attack emulation.

In one implementation, in Block S180, the computer system 102 can generate the executable file configured to trigger generation of an event log file (or "log")—at the first internal asset 110—including a set of event records (e.g., security event records, network event records) published by security technologies deployed on the target network (or the first internal asset 110) for responses to the attack emulation.

Upon execution of the executable file and once the attack emulation is deployed and initiated on the target network at the start time, the internal asset 110 can aggregate a set of event data records—such as event data records indicating detection, prevention, and/or alert events—published by these security technologies for responses to the attack emulation (or to transmission of particular data packets between source and destination assets during the attack emulation) until conclusion of the attack emulation, such as: upon receipt of confirmation that a source asset sent a last data packet to its designated destination asset; or upon expiration of a last absolute or relative timer for these data packets in the attack emulation. The internal asset 110 can then: compile these records into an event log file; and upload the event log file to the computer system 102. Additionally or alternatively, the internal asset 110 can store the event log file onto a removable memory storage device for (manual) loading onto the computer system 102.

In this implementation, the computer system 102 can access the event log file—from the internal asset 110—and execute the foregoing methods and techniques to associate detection, prevention, and alert events in the set of event data records with particular emulation actions within the attack emulation based on: correspondence between known transmission types of data packets by source assets and detection, prevention, and alert event times; and correspondence between source IP addresses, destination IP addresses, protocols, packet payloads, source and destination ports, request types, and request response types, etc. characteristic of known emulation actions and corresponding metadata captured in detection, prevention, and alert event published in these event data records.

17.8 Security Technology Validation

Block S170 of the method S100 recites, in response to absence of a network event record—in the set of network event records—indicating the malicious attack, generating a prompt to reconfigure the security technology to detect the malicious attack at the target computer network.

Block S172 of the method S100 recites, in response to presence of a network event record—in the set of network event records—indicating the malicious attack, confirming configuration of the security technology to respond to computer network attacks analogous to the malicious attack at the target computer network.

Generally, in Blocks S170 and S172, the computer system 102 can execute the foregoing methods and techniques: to compare detection, prevention, and alert events thus associated with the emulation action to target response types assigned to these emulation actions or to the attack emulation more generally in order to validate a current configuration of security technologies deployed to the target network; and then to selectively prompt investigation and reconfiguration of these security technologies responsive to failure of these security technologies to respond to the attack as planned.

As described above, for each emulation action in the attack emulation, the computer system 102 verifies that at least one security technology (or a particular security technology) detected, prevented, or alerted on the emulation action according to a response type assigned to this emulation action; if not, the computer system 102 flags these security technologies (or the particular security technology) for investigation and reconfiguration. Additionally or alternatively, the computer system 102 can verify that at least one security technology (or an particular security technology) detected, prevented, or alerted on the attack emulation as a whole according to a response type assigned to this attack emulation; if not, the computer system 102 can flag these security technologies as not properly configured to respond to an analogous attack on the target network and prompt further investigation and reconfiguration of these security technologies accordingly.

In one example, the computer system 102 recombines a first cluster of packet fragments—designating a first source address and a first destination address within the PCAP file—to generate a first data packet in Block S120. The computer system 102 then assigns a first target "detect" response—by a security technology deployed on the target network—to the first data packet during the attack emulation.

Similarly, in this example, the computer system 102 recombines a second cluster of packet fragments—designating a second source address and a second destination address within the PCAP file—to generate a second data packet in Block S120. The computer system 102 also assigns a second target "prevention" response—by the security technology—to the second data packet during the attack emulation.

During subsequent execution of the attack emulation, a second external asset 120—outside the target network—initiates transmission of the first data packet to a first internal asset 110, within the target network, according to a first transmission trigger; and the first internal asset 110 similarly initiates transmission of the second data packet to a third asset (or back to the second external asset 120) according to a second transmission trigger.

During or upon completion of the attack emulation, the computer system 102 scans the event log file generated by the internal asset 110 for a security event indicating detection of a transmission from a transmission from the second external asset 120 to the first internal asset 110 during the period of the attack emulation in Block S160. (Upon detecting this security event in the event log file, the computer system 102 can also verify that the security event corresponds to the first data packet based on a digital signature, indicators of compromise, or other data representative of the first data packet in the security event.) Upon detecting or confirming the security event in the event log file, the computer system 102 can confirm that the security technology is functioning as planned during the attack emulation and is therefore properly configured in Block S172. Conversely, in response to absence of a security event indicating detection of transmission of the first data packet during the attack emulation, the computer system 102 can: determine that the security technology did not function as planned during the attack emulation; and thus generate a first prompt to reconfigure the security technology to detect network traffic—analogous to the first data packet—on the target network in Block S170.

The computer system 102 similarly scans the event log file for a second event indicating prevention of a transmission from the first internal asset 110 to the second external asset 120 during the period of the attack emulation in Block S160. (Upon detecting this security event in the event log file, the computer system 102 can also verify that the security event corresponds to the second data packet based on a digital signature, indicators of compromise, or other data representative of the second data packet in the security event.) Upon detecting or confirming the security event in the event log file, the computer system 102 can confirm that the security technology is functioning as planned during the attack emulation and is therefore properly configured in Block S172. Conversely, in response to absence of a security event indicating prevention of transmission of the second data packet during the attack emulation, the computer system 102 can: determine that the security technology did not function as planned during the attack emulation; and thus generate a second prompt to reconfigure the security technology to prevent network traffic—analogous to the second data packet—on the target network in Block S170.

17.9 Emulation Cleanup

In one implementation, upon completion of the attack emulation and in response to generation of the event log file, the first internal asset 110 removes the set of data packets and the set of transmission triggers from local memory of the first internal asset 110. Additionally, the first internal asset 110 can remove other data and/or artifacts generated responsive to execution of the executable file at the first internal asset 110.

Therefore, rather than persistently storing attack emulation commands and/or data in local memory of the first internal asset 110, the computer system 102 enables the first internal asset 110: to extract the set of data packets and the set of transmission (or behavior) triggers from the executable file; to trigger storage of these data packets and transmission triggers in local memory of the first internal asset 110 during the attack emulation; and to remove (or "clean") these data packets, transmission triggers, and other data from local memory of the first internal asset 110 upon completion of the emulation.

17.10 Reconfiguration

In one implementation, as described above, the computer system 102 can automatically deploy identical instances and/or variations of the attack emulation to the target network over time in response to reconfiguration of a security technology on the target network in order to verify whether this reconfiguration effected detection, prevention, or alerting on the attack emulation by the security technology. For example, the computer system 102 flags a security technology for failing to respond as planned or expected to a stage of a first instance of the attack emulation executed on the target network. Later, and following (or in response to) confirmation of reconfiguration of the security technology according to result of the first instance of the attack emulation, the computer system 102 initiates transmission of the same set of data packets between the same set of source and recipient assets according to the same transmission triggers in order to re-emulate the malicious attack on the target network with minimum changes from the previous instance of the attack emulation. More specifically, the computer system 102 initiates transmission of the same set of data packets responsive to execution (or re-execution) of the same executable file at the internal asset 110. The computer system 102 then implements methods and techniques described above: to rescan an event log file for a security event related to re-emulation of the malicious attack on the target network; to confirm configuration of the security technology to respond to the malicious attack in response to presence of the second security event in the event log file; and/or to flag the security technology for further reconfiguration in response to absence of the second security event in the event log file.

In one variation, in response to confirmation of reconfiguration of the security technology according to result of the first instance of the attack emulation, and in response to execution (or re-execution) of the executable file at the first internal asset 110, the computer system 102 can select a third external asset 120 from the pool of external assets 120—rather than the second external asset 120—for the emulation, such as based on availability of the third external asset 120 and unavailability of the second external asset 120 for the emulation. The computer system 102 can then transmit a message indicating an IP address of the third external asset 120 to the first internal asset 110; and the first internal asset 110 can replace external source IP addresses and external destination IP addresses with the IP address of the third external asset 120, as described above.

18. Target Network Exhibiting Network Boundary

Figure 8:
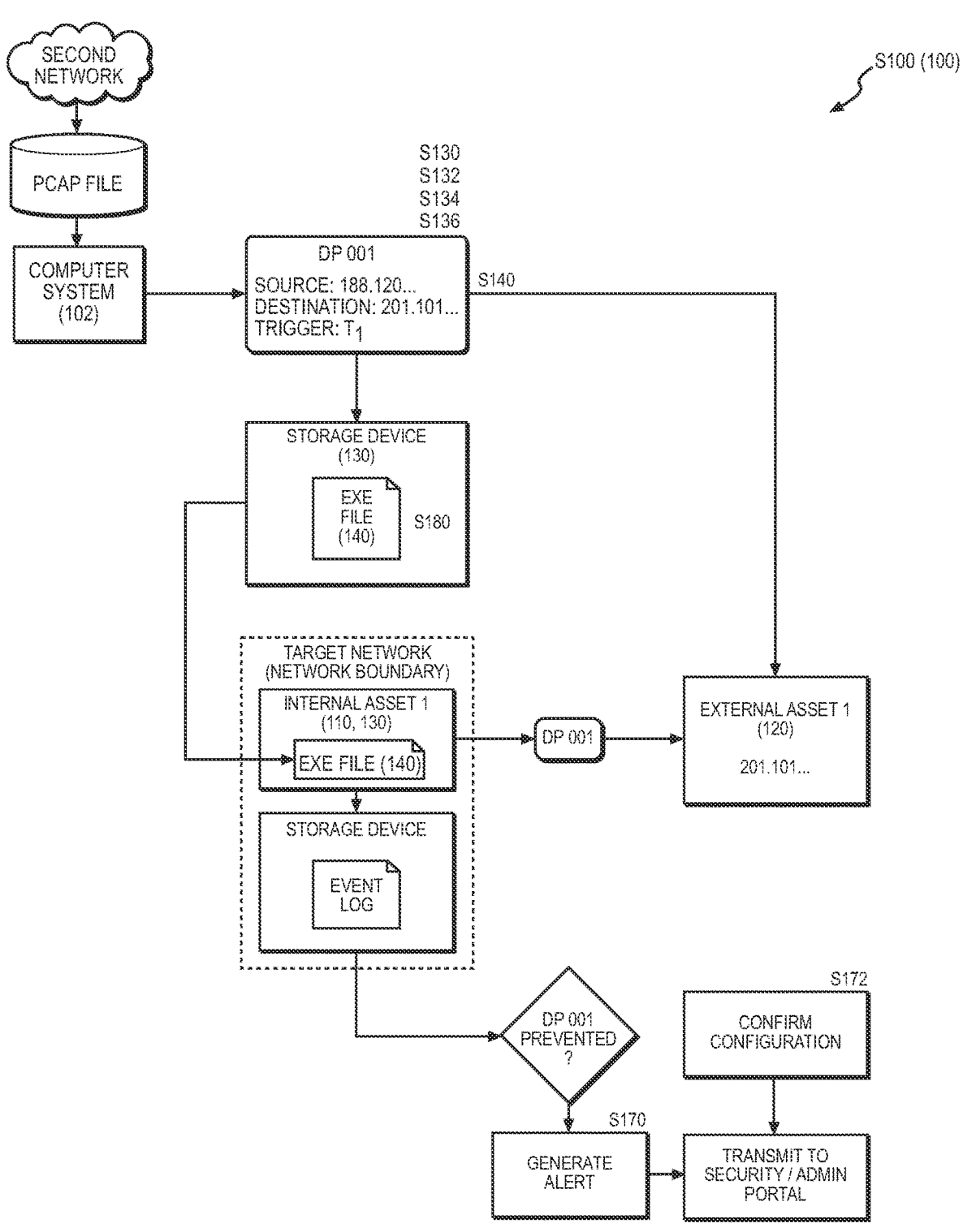
FIG. 8 is a flowchart representation of one variation of the method.

In one variation, as shown in FIG. 8, the computer system 102 can execute the foregoing methods and techniques to emulate a known attack on a target network exhibiting a network boundary (or an "air-gapped network"); and to compare detection, prevention, and alert events associated with emulation actions to target response types assigned to these emulation actions, or to the attack emulation more generally, in order to validate efficacy of the network boundary and/or a current configuration of security technologies deployed to the target network.

More specifically, the computer system 102 can interface with (or include): an integration manager 104; an internal asset(s) 110 located within a target network exhibiting a network boundary; and a pool of external assets 120 outside of the target network and the network boundary. Each external asset 120, in the set of assets, can include an external agent installed thereon. However, the internal asset 110 excludes an internal agent—loaded with attack emulation software and thus configured to execute steps of attack emulations on the target network—installed thereon.

In this variation, the computer system 102 can execute the foregoing methods and techniques: to recombine a first cluster of packet fragments—designating a first source address and a first destination address within the PCAP file—to generate a first data packet; to select an external asset 120 (e.g., the second external asset 120 from the pool of external assets 120, a dedicated server)—located outside of the target network and the network boundary—as a recipient asset to receive the first data packet; to assign a first transmission trigger to the first data packet; to select the first internal asset 110 as a source asset to transmit the first data packet according to the first transmission trigger; to replace the first source address with a first IP address of the first internal asset 110; to replace the first destination address with a second IP address of the second external asset 120; and to assign a first target "prevent" response—by a security technology deployed on the target network—to the first data packet during the attack emulation; and to generate the executable file populated with the first data packet and the first transmission trigger.

The computer system 102 can store the executable file onto a removable memory storage device. An operator may then: connect the removable memory storage device to the first internal asset 110 within the target network; load the executable file from the removable memory storage device onto the first internal asset 110; and initiate execution of the executable file at the first internal asset 110.

During subsequent execution of the attack emulation, the first internal asset 110—located within the target network and the network boundary—initiates transmission of the first data packet to the second external asset 120, located outside of the target network and the network boundary, according to the first transmission trigger.

During or upon completion of the attack emulation, the computer system 102 scans the event log file generated by the internal asset 110 for a security event indicating prevention of a transmission from the first internal asset 110 to the second external asset 120 during the period of the attack emulation in Block S160. (Upon detecting this security event in the event log file, the computer system 102 can also verify that the security event corresponds to the first data packet based on a digital signature, indicators of compromise, or other data representative of the second data packet in the security event.) Upon detecting or confirming the security event in the event log file, the computer system 102 can confirm that the security technology and/or the network boundary are functioning as planned during the attack emulation and are therefore properly configured in Block S172. Conversely, in response to absence of a security event indicating prevention of transmission of the first data packet during the attack emulation, the computer system 102 can: determine that the security technology and/or the network boundary did not function as planned during the attack emulation; and thus generate a prompt to reconfigure the security technology and/or the network boundary to prevent network traffic—analogous to the first data packet—across the network boundary of the target network in Block S170.

19. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

41

We claim:

1. A system for emulating a known attack on a computer network, the system comprising:

a second external asset; and a computer system configured to:

access a set of data packets representing data transmitted between machines in communication with a second computer network during a malicious attack on the second computer network;

select a set of assets as actors in an emulation of the malicious attack on a target computer network, the set of assets comprising:

a first internal asset within the target computer network; and the second external asset external to the target computer network;

for each data packet in the set of data packets:

assign a transmission trigger, in a set of transmission triggers, to the data packet based on transmission of corresponding data during the malicious attack on the second computer network;

select a recipient asset, in the set of assets, to receive the data packet; and select a source asset, in the set of assets, to transmit the data packet to the recipient asset according to the transmission trigger;

generate an executable file:

comprising the set of data packets;

defining the set of transmission triggers; and configured to selectively initiate transmission of data packets in the set of data packets, from the first internal asset to recipient assets in the set of assets, according to transmission triggers in the set of transmission triggers, responsive to execution of the executable file at the first internal asset;

store the executable file for loading onto the first internal asset; and trigger the second external asset to store the set of data packets in local memory.

2. The system of claim 1, wherein the computer system is further configured to:

access a set of network event records generated by a security technology, deployed on the target computer network, during transmission of the set of data packets from source assets to recipient assets, in the set of assets, according to the set of transmission triggers; and in response to absence of a network event record, in the set of network event records, indicating the malicious attack:

generate a prompt to reconfigure the security technology to detect the malicious attack at the target computer network.

3. The system of claim 2:

wherein the computer system configured to generate the executable file comprises the computer system configured to generate the executable file configured to trigger the first internal asset to generate a log comprising the set of network event records; and wherein the computer system configured to access the set of network event records comprises the computer system configured to access the log comprising the set of network event records.

4. The system of claim 1, wherein the computer system is further configured to:

access a set of network event records generated by a security technology, deployed on the target computer network, during transmission of the set of data packets from source assets to recipient assets, in the set of assets, according to the set of transmission triggers; and in response to presence of a network event record, in the set of network event records, indicating the malicious attack:

confirm configuration of the security technology to respond to computer network attacks analogous to the malicious attack at the target computer network.

5. The system of claim 1:

wherein the computer system configured to access the set of data packets comprises the computer system configured to access the set of data packets comprising a first data packet designating a first source address within the second computer network;

wherein the computer system configured to assign a transmission trigger, select a recipient asset, and select a source asset to each data packet in the set of data packet comprises the computer system configured to:

assign a first transmission trigger, in the set of transmission triggers, to the first data packet;

select the second external asset to receive the first data packet;

select the first internal asset to transmit the first data packet to the second external asset according to the first transmission trigger; and replace the first source address, designated in the first data packet, with a second address of the first internal asset; and wherein the computer system configured to generate the executable file comprises the computer system configured to generate the executable file comprising the first data packet designating the second address of the first internal asset.

6. The system of claim 5:

wherein the computer system configured to select the set of assets as actors in the emulation of the malicious attack on the target computer network comprises the computer system configured to select the set of assets comprising:

the first internal asset located within the target computer network exhibiting a network boundary; and the second asset external to the target computer network and the network boundary; and wherein the computer system is further configured to:

access a set of network event records generated by a security technology, deployed on the target computer network, during transmission of the set of data packets from source assets to recipient assets, in the set of assets, according to the set of transmission triggers; and in response to absence of a network event record, in the set of network event records, representing prevention of transmission from the first internal asset to the second external asset:

generate a prompt to reconfigure the security technology to prevent computer network traffic, analogous to the first data packet, across the network boundary of the target computer network.

7. The system of claim 1:

further comprising a pool of external assets in the set of assets, the pool of external assets comprising the second external asset; and wherein the computer system configured to select the set of assets as actors in the emulation of the malicious attack on the target computer network comprises the computer system configured to:

in response to execution of the executable file at the first internal asset, select the second external asset, from the pool of external assets, as an actor to emulate the external machine during the emulation of the malicious attack on the target network;

generate a first message indicating a first address of the second external asset in plain text format; and transmit the first message to the first internal asset.

8. The system of claim 7, wherein the computer system configured to select the second external asset from the pool of external assets comprises the computer system configured to:

identify a set of characteristics of an external machine, external to the second computer network, involved in the malicious attack on the second computer network based on addresses of source machines and addresses of destination machines associated with data interchanges represented by the set of data packets; and select the second external asset exhibiting characteristics analogous to the set of characteristics of the external machine.

9. The system of claim 1:

wherein the computer system configured to assign a transmission trigger, select a recipient asset, and select a source asset to each data packet in the set of data packet comprises the computer system configured to:

assign a first transmission trigger, in the set of transmission triggers, to a first data packet in the set of data packets;

select the first internal asset to receive the first data packet; and select the second external asset to transmit the first data packet to the first internal asset according to the first transmission trigger; and wherein the second external asset comprises an agent configured to initiate transmission of the first data packet from the second external asset to the first internal asset according to the first transmission trigger.

10. The system of claim 9, wherein the computer system is further configured to:

transmit a first command, corresponding to the first transmission trigger, to the second external asset; and transmit a second command, corresponding to a second transmission trigger in the set of transmission triggers, to the first internal asset in response to receiving a first message, from the first internal asset, indicating receipt of the first data packet.

11. The system of claim 1, wherein the computer system configured to access a set of data packets comprises the computer system configured to:

access a packet capture file representing packet fragments transmitted between machines in communication with the second network during the malicious attack on the second network; and recombine packet fragments within the packet capture file based on packet fragment metadata to generate the set of data packets.

12. The system of claim 1, wherein the computer system is further configured to initiate transmission of the set of data packets from source assets to recipient assets, in the set of assets, according to the set of transmission triggers to emulate the malicious attack on the target network.

13. A non-transitory computer-readable medium storing an executable file comprising instructions that, when executed by a processor of a first internal asset in a set of assets and within a target computer network, cause the processor to:

access a set of data packets from the executable file, the set of set of data packets representing data transmitted between machines in communication with a second computer network during a malicious attack on the second computer network, each data packet in the set of data packets:

associated with a transmission trigger, in a set of transmission triggers, based on transmission of corresponding data during the malicious attack on the second computer network;

defining a recipient asset, in the set of assets, to receive the data packet; and defining the source asset, in the set of assets, to transmit the data packet to the recipient asset according to the transmission trigger;

store the set of data packets in local memory of the first internal asset, the set of data packets comprising a first data packet to which the first internal asset and a second external asset, in the set of assets, are assigned;

initiate transmission of the first data packet from the first internal asset to the second external asset according to a first transmission trigger, in the set of transmission triggers, during a target time period; and generate a set of network event records during transmission of the set of data packets from source assets to recipient assets, in the set of assets, according to the set of transmission triggers during the target time period.

14. The non-transitory computer-readable medium of claim 13, wherein the executable file further comprises instructions that, when executed by the processor, cause the processor to:

detect a first digital signature within a second data packet, in the set of data packets, received from the second external asset, the first internal asset and the second external asset assigned to the first internal asset assigned to the second data packet; and discard the second data packet in response to detecting the first digital signature.

15. The non-transitory computer-readable medium of claim 14, wherein the executable file further comprises instructions that, when executed by the processor, cause the processor to:

generate a first message indicating receipt of the second data packet from the second external asset; and transmit the first message to a computer system.

16. The non-transitory computer-readable medium of claim 15, wherein the executable file further comprises instructions that, when executed by the processor, cause the processor to:

in response to receiving a second message, at the first internal asset and from the computer system, representing a second transmission trigger in the set of transmission triggers:

initiate transmission of a third data packet, in the set of data packets, from the first internal asset to the second external asset according to the second transmission trigger.

17. The non-transitory computer-readable medium of claim 13, wherein the executable file further comprises instructions that, when executed by the processor, cause the processor to:

query a computer system for a target address of a recipient asset to receive the first data packet, the first data packet designating a first destination address; and in response to receiving a second address of the second external asset assigned to the first data packet, replace the first destination address, designated in the first data packet, with the second address of the second external asset.

18. The non-transitory computer-readable medium of claim 13, wherein the executable file further comprises instructions that, when executed by the processor, cause the processor to remove the set of data packets from local memory of the first internal asset during the second time period succeeding the target time period.

19. A system for emulating a known attack on a computer network, the system comprising:

a computer system configured to:

access a set of data packets representing behaviors of machines in communication with a second computer network during a malicious attack on the second computer network;

select a set of assets as actors in an emulation of the malicious attack on a target computer network, the set of assets comprising:

a first internal asset within the target computer network; and a second external asset external to the target computer network;

for each data packet in the set of data packets:

assign a behavior trigger, in a set of behavior triggers, to the data packet based on a corresponding behavior during the malicious attack on the second computer network;

select a recipient asset, in the set of assets, to receive the data packet; and select a source asset, in the set of assets, to transmit the data packet to the recipient asset according to the transmission trigger;

generate an executable file:

populated with the set of data packets and the set of behavior triggers; and configured to selectively initiate transmission of the data packets, in the set of data packets, from the first internal asset to recipient assets in the set of assets, according to behavior triggers in the set of behavior triggers, responsive to execution of the executable file at the first internal asset; and store the executable file for loading onto the first internal asset.

20. The system of claim 19:

wherein the computer system is further configured to:

initiate transmission of the set of data packets from source assets to recipient assets, in the set of assets, according to the set of behavior triggers to emulate the malicious attack on the target network during a target time period;

access a set of network event records generated by a security technology, deployed on the target computer network, during the target time period; and in response to absence of a network event record, in the set of network event records, indicating the malicious attack:

generate a prompt to reconfigure the security technology to detect the malicious attack at the target computer network.

* * * * *